US012682721B2

(12) United States Patent
Urban et al.

(10) Patent No.: US 12,682,721 B2
(45) Date of Patent: Jul. 14, 2026

(54) MODULAR HOUSING FOR AN ELECTRONIC GAMING ASSEMBLY

(71) Applicant: Aristocrat Technologies, Inc., Las Vegas, NV (US)

(72) Inventors: Bruce Urban, Las Vegas, NV (US); Ariel Turgel, San Francisco, CA (US); Daniel Harden, Palo Alto, CA (US); Craig Paulsen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 291 days.

(21) Appl. No.: 18/182,802

(22) Filed: Mar. 13, 2023

(65) Prior Publication Data

US 2023/0368605 A1 Nov. 16, 2023

Related U.S. Application Data

(60) Provisional application No. 63/342,492, filed on May 16, 2022.

(51) Int. Cl.
*G07F 17/00* (2006.01)
*G07F 17/32* (2006.01)

(52) U.S. Cl.
CPC ...... *G07F 17/3216* (2013.01); *G07F 17/3223* (2013.01); *G07F 17/323* (2013.01); *G07F 17/3237* (2013.01)

(58) Field of Classification Search
None
See application file for complete search history.

(56) References Cited

U.S. PATENT DOCUMENTS

| | | | | |
|---|---|---|---|---|
| 5,036,779 A * | 8/1991 | Capraro | A47F 10/00 | 109/24.1 |
| D361,192 S * | 8/1995 | Dallman | D99/28 | |
| 5,553,552 A * | 9/1996 | Bauer | G07F 19/205 | 40/606.03 |
| D375,606 S * | 11/1996 | Dallman | D99/28 | |
| D423,181 S * | 4/2000 | Dallman | D99/28 | |
| 6,068,101 A * | 5/2000 | Dickenson | G07F 9/06 | 463/25 |
| 6,276,602 B1 * | 8/2001 | Henderson | G07D 11/40 | 235/444 |
| 6,702,409 B2 * | 3/2004 | Hedrick | G07F 17/32 | 312/223.1 |
| 6,923,720 B2 | 8/2005 | Loose | | |
| 7,900,922 B1 * | 3/2011 | Mallory | G07F 17/34 | 463/20 |

(Continued)

*Primary Examiner* — Paul A D'Agostino
(74) *Attorney, Agent, or Firm* — Armstrong Teasdale LLP

(57) ABSTRACT

A modular housing for an electronic gaming assembly is described. The modular housing includes a front wall including an upper portion, a first side portion, and a second side portion. The first and second side portions extend from the upper portion and at least partially define an opening, and the first and second side portions each have an inner edge and an outer edge. The modular housing also includes a first side wall extending from the outer edge of the first side portion and a second side wall extending from the outer edge of the second side portion. The opening is sized to receive the electronic gaming assembly. At least one of the first side wall and the second side wall forms an acute angle with the front wall.

20 Claims, 12 Drawing Sheets

(56) References Cited

U.S. PATENT DOCUMENTS

| | | | | |
|---|---|---|---|---|
| 8,133,114 | B2 | 3/2012 | Gagner | |
| 8,303,420 | B2 * | 11/2012 | Chudek | G07F 17/32<br>463/46 |
| 8,454,444 | B2 * | 6/2013 | Cole | G07F 17/3202<br>463/46 |
| D714,875 | S * | 10/2014 | Wudtke | D21/385 |
| 8,851,989 | B2 * | 10/2014 | Rosander | G07F 17/3216<br>463/31 |
| 8,905,842 | B2 | 12/2014 | Bainbridge | |
| 9,409,093 | B2 * | 8/2016 | Gadda | A63F 13/90 |
| 9,514,599 | B2 * | 12/2016 | Lesley | G07F 17/3216 |
| 9,558,615 | B2 * | 1/2017 | Maas | G07F 9/10 |
| D780,747 | S * | 3/2017 | Sharp | D14/496 |
| 9,659,434 | B2 * | 5/2017 | Bainbridge | G07F 17/3218 |
| 9,679,435 | B2 * | 6/2017 | Schrementi | G07F 17/3213 |
| 9,710,997 | B2 | 7/2017 | Schrementi | |
| D819,747 | S * | 6/2018 | Castro | D21/369 |
| D820,915 | S * | 6/2018 | Lee | D21/369 |
| D826,338 | S * | 8/2018 | Bussey | D21/369 |
| D849,149 | S * | 5/2019 | Bussey | D21/369 |
| 10,460,570 | B2 * | 10/2019 | Ikeda | A47B 88/40 |
| D868,718 | S * | 12/2019 | Hodgson | D14/127 |
| D880,604 | S * | 4/2020 | Olive | D21/369 |
| D880,605 | S * | 4/2020 | Bussey | D21/369 |
| D890,265 | S * | 7/2020 | Johnson | D21/369 |
| D934,347 | S * | 10/2021 | Ocampo | D21/370 |
| D936,150 | S * | 11/2021 | Bussey | D21/369 |
| D952,751 | S * | 5/2022 | Kulujian | D21/369 |
| D952,752 | S * | 5/2022 | Kulujian | D21/369 |
| D959,562 | S * | 8/2022 | Edwards | D21/370 |
| D961,684 | S * | 8/2022 | Josifovski | D21/369 |
| 11,521,465 | B2 | 12/2022 | Thomas | |
| D977,014 | S * | 1/2023 | Bussey | D21/369 |
| 11,568,707 | B2 * | 1/2023 | Brandau | G07F 17/3241 |
| D978,810 | S * | 2/2023 | Lee | D14/125 |
| D992,520 | S * | 7/2023 | Lee | D14/125 |
| 11,875,631 | B2 * | 1/2024 | Villanueva | H05K 5/0221 |
| 2003/0100369 | A1 * | 5/2003 | Gatto | G07F 17/323<br>463/42 |
| 2005/0054449 | A1 * | 3/2005 | Kopera | G07F 17/32<br>463/46 |
| 2005/0057126 | A1 * | 3/2005 | Mallory | H05K 7/18<br>312/223.1 |
| 2005/0064942 | A1 * | 3/2005 | Hedrick | G07F 17/32<br>463/46 |
| 2005/0215325 | A1 * | 9/2005 | Nguyen | G07F 17/3202<br>463/16 |
| 2006/0042205 | A1 * | 3/2006 | Kalous | F24F 3/163<br>55/385.1 |
| 2008/0113794 | A1 * | 5/2008 | Cole | G07F 17/3216<br>463/31 |
| 2008/0182642 | A1 * | 7/2008 | Cole | G07F 17/32<br>463/20 |
| 2009/0009041 | A1 * | 1/2009 | Zeidler | G07F 17/3216<br>312/263 |
| 2009/0247261 | A1 * | 10/2009 | Koami | G07F 17/3202<br>463/20 |
| 2009/0253499 | A1 * | 10/2009 | Nagano | G07F 17/3211<br>463/30 |
| 2011/0118034 | A1 * | 5/2011 | Jaffe | G07F 17/3211<br>463/47 |
| 2012/0146893 | A1 * | 6/2012 | Maas | G07F 9/10<br>361/679.01 |
| 2015/0087404 | A1 * | 3/2015 | Lesley | G07F 17/3246<br>463/25 |
| 2015/0287289 | A1 * | 10/2015 | Lewis | G07F 19/2055<br>235/379 |
| 2016/0093143 | A1 * | 3/2016 | Lamb | G07F 17/3239<br>463/20 |
| 2017/0053483 | A1 * | 2/2017 | Borissov | G07F 17/3209 |
| 2017/0169663 | A1 * | 6/2017 | Froy | G07F 17/3239 |
| 2018/0082523 | A1 * | 3/2018 | Palermo | G07F 17/3244 |
| 2018/0108209 | A1 * | 4/2018 | Amegadjie | G07F 17/3209 |
| 2019/0096173 | A1 * | 3/2019 | Brandau | G07F 17/3223 |
| 2019/0266833 | A1 * | 8/2019 | Lee | G07F 17/3216 |
| 2019/0311570 | A1 * | 10/2019 | Lamb | G07F 17/34 |
| 2020/0051403 | A1 * | 2/2020 | Neufeld | E05G 1/024 |
| 2020/0118379 | A1 * | 4/2020 | Danielson | G07F 17/3211 |
| 2020/0118383 | A1 * | 4/2020 | Hodgson | G07F 17/3209 |
| 2021/0090383 | A1 * | 3/2021 | Rodriguez | G07F 17/3216 |
| 2021/0110638 | A1 * | 4/2021 | Chambers | G07F 17/3213 |
| 2021/0110642 | A1 * | 4/2021 | Ocampo | G07F 17/3216 |
| 2021/0209893 | A1 * | 7/2021 | Rye | G07F 17/3241 |
| 2021/0295638 | A1 * | 9/2021 | Urban | G07F 17/3211 |

* cited by examiner

MODULAR HOUSING FOR AN ELECTRONIC GAMING ASSEMBLY

CROSS-REFERENCE TO RELATED APPLICATIONS

This application claims the benefit of priority to U.S. Provisional Patent Application No. 63/342,492, filed May 16, 2022, the contents of which are incorporated herein by reference in their entirety.

TECHNICAL FIELD

The field of disclosure relates generally to electronic gaming, and more particularly, to a modular housing having a front display wall that is configured to receive an electronic gaming assembly (EGA) within the modular housing, provide additional lighting and display features in combination with the EGA, be positioned adjacent to other modular housings to form groups (e.g., banks or configurations) of EGAs within modular housings, communicate with the modular housings within the group, and display content associated with game play on the housed EGA.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Currently, when positioning electronic gaming assemblies (EGAs), which may include EGMs, at a venue, for example on a casino floor, challenges are presented. Floorspace is highly valuable and sought-after. For example, currently, some popular games are included in a bank of EGAs with a shared "community" or common display above the bank of EGAs. As games become more or less popular, there is no flexibility or little flexibility in changing the number of EGAs in the bank (e.g., the only options are to keep all EGAs and common displays or remove all EGAs and common displays—or remove some EGAs but keep the same large common display). Further, limited/static numbers of screens/lights/display areas to communicate information to visitors and players are currently provided. Thus, improved and more flexible modular housing assemblies with EGAs are desired.

BRIEF DESCRIPTION

In one aspect, a modular housing for an electronic gaming assembly includes a front wall including an upper portion, a first side portion, and a second side portion. The first and second side portions extend from the upper portion and at least partially define an opening. The first and second side portions each have an inner edge and an outer edge. The modular housing also includes a first side wall extending from the outer edge of the first side portion and a second side wall extending from the outer edge of the second side portion. The opening is sized to receive the electronic gaming assembly. At least one of the first side wall and the second side wall forms an acute angle with the front wall.

In another aspect, a system includes a first modular housing for housing a first electronic gaming assembly and a second modular housing for housing a second electronic gaming assembly. The first modular housing includes a front wall including an upper portion, a first side portion, and a second side portion. The first and second side portions each extend from the upper portion and at least partially define an opening sized to receive the first electronic gaming assembly. The first and second side portions each have an inner edge and an outer edge. The first modular housing also includes a first side wall extending from the outer edge of the first side portion and a second side wall extending from the outer edge of the second side portion. The second modular housing includes a front wall including an upper portion, a first side portion, and a second side portion. The first and second side portions each extend from the upper portion and at least partially define an opening sized to receive the second electronic gaming assembly. The first and second side portions each have an inner edge and an outer edge. The second modular housing also includes a first side wall extending from the outer edge of the first side portion and a second side wall extending from the outer edge of the second side portion. The second modular housing is positioned at a right angle to the first modular housing to form a perpendicular configuration of two modular housings.

In yet another aspect, a system includes a first modular housing for housing a first electronic gaming assembly and a second modular housing for housing a second electronic gaming assembly. The first modular housing includes a front wall including an upper portion, a first side portion, and a second side portion. The first and second side portions each extend from the upper portion and at least partially define an opening sized to receive the first electronic gaming assembly. The first and second side portions each have an inner edge and an outer edge. The first modular housing also includes a first side wall extending from the outer edge of the first side portion and a second side wall extending from the outer edge of the second side portion. At least one of the first side wall and the second side wall forms an acute angle with the front wall. The second modular housing includes a front wall including an upper portion, a first side portion, and a second side portion. The first and second side portions each extend from the upper portion and at least partially define an opening sized to receive the second electronic gaming assembly. The first and second side portions each have an inner edge and an outer edge. The second modular housing also includes a first side wall extending from the outer edge of the first side portion and a second side wall extending from the outer edge of the second side portion. At least one of the first side wall and the second side wall forms an acute angle with the front wall. The second modular housing is positioned adjacent to the first modular housing to form a side-by side configuration of two modular housings.

DETAILED DESCRIPTION

Figure 1:
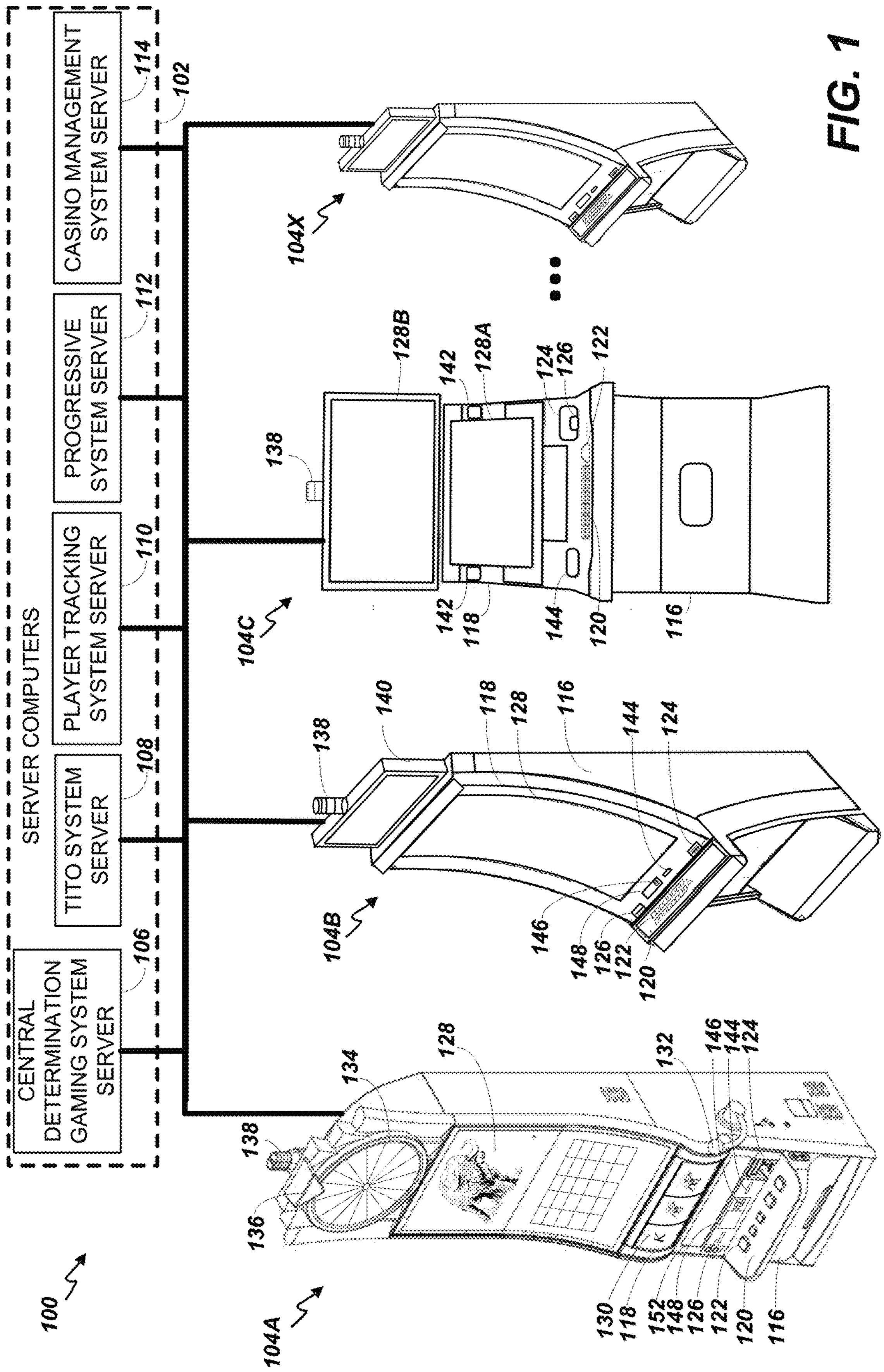
FIG. 1 is an exemplary diagram showing several EGMs networked with various gaming related servers.

The systems and methods described herein relate generally to electronic gaming, and more particularly, to a modular housing for housing an electronic gaming assembly (EGA) (which may be, e.g., EGMs 104A-X, a kiosk, ATM, or any other electronic device that may be used within a casino environment or other environment). As used herein "assembly", when used alone (e.g., assembly 402), refers to the combination of a modular housing (e.g., housing 406) and the corresponding EGA (e.g., EGA 404). In the example embodiment, the housing includes a front display wall, two opposing side walls, a rear wall, and a top wall. The front display wall includes an opening that is sized and configured to receive an EGA so that the EGA can be positioned at least mostly within the housing. The front display wall is further configured to include display panels or screens (e.g., fiber optics, LCD, LED, vinyl wrap with no electronic back lighting, etc.) that are configured to display data, text, images, animations, and any other content for communication to a visitor or a player. The modular housing may also include a sound system that produces sound complementary to content displayed on the assembly and/or the corresponding EGA. The modular housing assembly may be in communication with other modular housing assemblies via a common central controller such that display and/or sounds produced across the assemblies are synchronized (e.g., the central controller may be at least one processor in an EGA, at least one processor separate from an EGA that controls one or more assemblies (e.g., a local controller), and/or at least one processor in a backend server that controls one or more assemblies).

In some embodiments, the front display wall (e.g., display 432) may be configured to display content to attract players to play the games on the EGA. Further, the front display wall may be in communication with the EGA or a gaming server executing the game being played on the EGA so that the content displayed is associated with the game play on the EGA. In some embodiments, the front display wall may be in communication with a neighboring front display wall corresponding to a different assembly/EGA, and the content displayed may be continuous across the two (or more) front display walls. In some embodiments, one or more front display walls may be in communication with the central controller (e.g., in an EGA and/or a local controller separate from an EGA) or a backend server, with the central controller or the backend server controlling the content displayed on the one or more front display walls. The central controller and/or the backend server may include a processor coupled to at least one memory device. The central controller or the backend server may determine a number of housing modules in a bank or configuration, where a bank or configuration includes a plurality of connected housing modules, and the central controller or the backend server may control content displayed on the corresponding front display walls based on the number of modular housing assemblies that are controlled by the central controller or the backend server. In some embodiments, any wall of an assembly may display content similar to the front display wall.

Although, in the described embodiments, the central controller is described as a hardware component being in communication with and controlling a configuration or bank of assemblies, the central controller could also be a backend server (e.g., server 102) connected to and controlling a bank or configuration of machines. In some embodiments, the central controller may also be local to each assembly such that each assembly (including assemblies in the same configuration or bank) is individually controlled by a different central controller. For example, the central controller could be a component of an EGA of an assembly, with the central controller only controlling the EGA to which it belongs and the corresponding assembly.

In some embodiments, the modular housing for an electronic gaming assembly includes a front wall including an upper portion, a first side portion, and a second side portion. The first and second side portions extend from the upper portion and at least partially define an opening, the first and second side portions each having an inner edge and an outer edge. The modular housing also includes a first side wall extending from the outer edge of the first side portion, and a second side wall extending from the outer edge of the second side portion. The opening may be sized to receive the electronic gaming assembly.

In some embodiments, the housing is configured with the opposing side walls extending at acute angles toward the rear wall which allows the corresponding assembly to be positioned next to a second assembly to form a right angle or an obtuse angle of the two housing assemblies. This modular aspect allows the EGAs housed inside the housing assemblies to be positioned in sets or pods having geometric shapes that conserve floor space within a venue (e.g., a casino) and are easily reconfigurable to address a current need of the EGA games. Example configurations are shown in more detail herein.

In some embodiments, the front display wall may include a part or portion that is a touch screen interface that enables interaction from players with content displayed on the front display wall. In some embodiments, the entire front display wall may be a touch screen interface, or the front display wall may not include a touch screen interface. In some embodiments, a player may interact with content displayed on assemblies via, e.g., the touch screen interface on the front display wall. For example, the assembly may display an advertisement for food or beverage services at the venue. While displaying the advertisement, the assembly may also display a button with text that reads "Press here to order". If the player presses the button, as an example, a beverage is ordered and then delivered to the assembly from which the player ordered the beverage. Payment for the beverage may be made, for example, at the time of ordering (e.g., via credit/debit card, via loyalty card, etc.) at the assembly or upon delivery of the beverage to the player. The touchscreen interface on the assemblies provides convenient access to additional functionalities that may not typically be provided by EGAs.

In some embodiments, the modular housing assembly with the EGA housed inside may include a modular assembly/housing (e.g., an LED matrix) surrounding the EGA. In some embodiments, the assembly may include any kind of signage. In the example embodiment, the EGA is configured to be positioned within the housing (e.g., the housing is placed, and the EGA may be moved (e.g., slid or carried) into an opening, or "garage," of the housing). In some embodiments, the housing may be moved (e.g., slid or carried) to surround an EGA. Accordingly, the assemblies described herein are versatile and easily reconfigurable.

In some embodiments, the modular housing assembly may also include a sound system that is controlled by the EGA, the central controller, or the backend server, using a similar process to that described for controlling the display. The sound system may be configured to produce sound that is synchronized to content displayed on the modular housing assembly. For example, if a bonus is presented on an EGA of one assembly and an animation is displayed on all assemblies connected to the same central controller as the one assembly on which the bonus is presented, then sound systems of all assemblies connected to the same central controller as the one assembly on which the bonus is presented may all produce the same sound effects corresponding to the animation. In some embodiments (e.g., during normal gameplay), a sound system of an assembly produces sounds specific to that assembly, even when the assembly is in communication with other assemblies (e.g., via central controller).

In the example embodiment, a housing and the corresponding EGA of an assembly each include their own respective power cable and are coupled to different power sources (e.g., different electrical outlets). In some embodiments, a modular housing and the corresponding EGA are mechanically and/or electrically coupled together. For example, the housing and EGA of the same assembly may draw electrical power from one another via wired electrical connections between the housing and the EGA or via wireless power transfer between the housing and the EGA. In such embodiments, only one of the housing and the EGA of an assembly require an electrical connection to a power source in order to power both the housing and the EGA.

In some embodiments, assemblies may be moved together to form a configuration or bank. When forming a configuration or bank, the assemblies may be in communication with a common central controller, and the display of each assembly may be controlled via the common central controller, as further described herein. Additionally, assemblies may be added to or removed from a configuration or bank via physical reconfiguration (e.g., moving the assembly closer to or further away from the bank) and electrical reconfiguration (e.g., connecting or disconnecting the assembly to a local area network formed by the central controller of a configuration or bank).

In some embodiments, the central controller determines the number of assemblies in a bank or configuration (e.g., the number of assemblies connected to the central controller) via signals received from the corresponding EGAs (e.g., and/or the number of assemblies currently in the bank is stored in memory based on in input (e.g., from casino personnel)). For example, the central controller may receive signals from the EGAs where each respective signal has a unique identifier associated with the respective EGA from which the signal was sent. The central controller then identifies the number of unique identifiers received, which corresponds to the number of EGAs in the bank or configuration.

In some embodiments, gameplay on one EGA may affect display on the corresponding assembly and on the assemblies of other EGAs. That is, display on one EGA or one assembly may affect display on other assemblies and/or EGAs corresponding to the other assemblies. In one example, a bonus may be presented on an EGA of one assembly, and an animation may appear on (e.g., or may transition between) all assemblies in a bank or configuration of assemblies (e.g., as shown in FIGS. 6-9) connected with the assembly where the bonus was presented. That is, the central controller monitors gameplay on the EGA, and, when a bonus is presented on the EGA, the central controller controls all assemblies connected to the central controller to display an animation (or a part of an animation if, e.g., the animation is continuously displayed on more than one assembly) based on the jackpot.

In some embodiments, the central controller determines which game (or games) are played on assembles connected to a central controller and how many assemblies are connected to (and controlled by) the central controller before determining content to display on the assembly. For example, the central controller may determine that the same game is played on all assemblies connected to a central controller. Additionally, the central controller may determine that there are four assemblies controlled by the central controller. Next, based on the determined number of assemblies and the game played on the assemblies, the controller determines content that may be displayed on the configuration of assemblies. For example, some content to display may be specific to a certain game and/or require two or more assemblies, three or more assemblies, four or more assemblies, etc. for display.

In some embodiments, the central controller may also determine an arrangement of assemblies, e.g., by determining positioning of the assemblies in a bank or configuration relative to one another via position sensors (e.g., a global positioning system (GPS) sensor, ultrasonic position sensor, etc.). In some embodiments, the number of assemblies and the arrangement of the assemblies may be manually input to the central controller. Based on the number of assemblies in the configuration or bank and the detected arrangement of assemblies in the configuration or bank, the central controller may determine suitable content that may be displayed on the assemblies of the configuration or bank. For example, if the central controller determines that there are two assemblies next to one another such that the front display wall of each assembly forms a substantially continuous display, the central controller may determine that some content to display (e.g., text) may be continuously displayed across assemblies.

In some embodiments, different animations corresponding to different numbers of assemblies in a bank may be stored in memory. For example, for a game event (e.g., a jackpot, initiation of a "frenzy" mode), different animations corresponding to different numbers of assemblies may be stored in memory (e.g., wherein the animations have the same theme). For example, in some embodiments a buffalo stampede animation may be determined to be provided. Upon determining to provide the buffalo stampede animation, a lookup in memory may be performed in order to retrieve the buffalo stampede animation that corresponds to the number of assemblies currently in the bank. For example, the animation for a four EGA configuration would be different than the animation for a two EGA configuration, in order for the animation to be controlled to be displayed across each of the number of assemblies. Similar lookups may be performed for other events where different animations are displayed (e.g., advertisements, scheduled events, etc.).

Further, if the central controller determines that an assembly is part of a configuration, but the front display wall of that assembly is not easily viewable at the same time as the other display walls of other assemblies of the configuration (e.g., an isolated assembly), then the central controller may determine that some content to display should not be continuously displayed across all assemblies in the configuration.

In some embodiments, content to display on an assembly may be based on content displayed on the corresponding EGA. For example, during gameplay, a player may have the option to mirror or extend the display on the EGA to the corresponding housing and/or onto other assemblies. Accordingly, the gameplay on EGA may be at least partially viewable on the corresponding housing and/or other assemblies, which may attract other players to play to unused EGAs of the configuration and/or may facilitate easier viewing of the gameplay by the user.

In some embodiments, content to display on an assembly or a bank of assemblies may be based upon certain events/triggers at at least one of the EGAs in the assembly. For example, the central controller may, based upon an event (e.g., a gameplay related event) at an EGA, determine a stored message/video sequence/animation (e.g., also based upon a number of assemblies in a bank) to be displayed that is associated with the event. The central controller may then communicate with one or more media players in order to control display of the determined message/video sequence/animation on at least one assembly in the bank of assemblies. For example, if a player receives a jackpot while playing a game on one EGA in a bank or configuration of assemblies, a signal may be sent to the central controller indicating that the jackpot was received. Based on the signal, the central controller may determine that content corresponding to the jackpot should be continuously displayed on all assemblies in the configuration or bank. The displayed content may be continuously or discontinuously displayed on assemblies in the configuration based on, e.g., the number of assemblies and/or the arrangement of assemblies in the configuration or bank.

In some embodiments, the central controller may track a schedule of events (e.g., events internal and/or external to the venue) and may control content to display on the assembly and/or the corresponding EGA and/or a bank or configuration of assemblies based on the tracked schedule of events. The schedule of events may be for events internal to a venue (e.g., shows at the venue/casino), or may be for events external to the venue (e.g., a sporting event at another location), and the displayed content may be related to the tracked event(s) (e.g., a show time or a score of a sporting event).

In some embodiments, a player may interact with content displayed on an assembly via gameplay on the corresponding EGA. For example, an assembly may display an advertisement for airline tickets, along with an indication that the player can "Earn bonus to receive 2× rewards points on your next flight". That is, if the player earns the bonus during gameplay, then the player will also earn 2× the rewards points on their next flight taken on the advertising airline. If the player earns the bonus, the assembly may, for example, display a message requesting the user interact with the touch screen of assembly to claim their airline reward. For example, the assembly may display "Tap here to claim your reward". Upon touching the indicated location on the touchscreen, the assembly presents the airline reward to the player (e.g., via a printed voucher, a barcode to scan with their mobile device, an upload onto their loyalty card).

In some embodiments, the assembly may receive information about a profile of a player (e.g., via a player profile associated with a player's loyalty card), and the assembly may display content based on the received information. That is, player information may affect display on the assembly. For example, when setting up an account with a venue (e.g., a casino), a player may provide information for a player profile (e.g., information viewable using player tracking interface 232) that is stored in the player profile. The information may include, for example, the player's first name, favorite color, favorite sports team, favorite food, birthday, etc. The player's profile may be linked to or stored on their loyalty card (e.g., at least one identifier for the player's profile may be stored on the loyalty card), and may also be linked to a mobile device of the player. When the player initiates play on an EGA (e.g., via their loyalty card or via their mobile device), the assembly accesses information (e.g., player account data) of the profile corresponding to the player (e.g., by using the identifier(s) stored on the loyalty card to perform a lookup on a server to retrieve information on the player profile associated with the loyalty card). In some embodiments, the assembly or the player's mobile device may prompt the player for permission to display content on the assemblies based on the information within the player's profile. In some embodiments, the player provides permission at an earlier time for the assemblies to display information from the player's profile. For example, if it is the player's birthday and the player's first name is "John", then the assembly or the player's mobile device may ask the player if they would like assembly to display a message for their birthday. Upon receiving permission, the assembly displays "Happy Birthday, John!". Depending on the number of assemblies in the configuration, the player may have the option to display the message on only their assembly, or across multiple assemblies.

In some embodiments, a player's player profile may include historical player information about games the player has previously played. For example, when a player plays "Game A", information is stored on the player's profile indicating the date on which the game was played and the duration for which the player played the game. When the player returns to play the same game, the assembly may display content based on the historical information stored in the player's profile. For example, if a player initiates play of a game, and the historical player information in the player's player profile indicates that the player played the same game the night before, then the assembly which the player is using may display a message welcoming the player back to the game.

In some embodiments, a player's player profile may affect which advertisements are displayed to the player when the player uses an assembly. For example, if the player's profile indicates that the player's favorite food is pizza, the assembly may display an advertisement for pizza at noon (e.g., lunch time).

In some embodiments, a player using an EGA may reserve another assembly, via their EGA, within the same bank of assemblies for another player who is not present. After reserving the assembly for the other player, the reserved assembly and/or the corresponding assembly may display content indicating that the assembly is reserved, along with other information (e.g., the first name of the player for which the assembly is reserved, the amount of time for which the assembly is reserved, etc.) provided by the player who reserved the assembly. In some embodiments, EGAs may be reserved for other purposes (e.g., tournament play), and the assemblies may display information regarding why their associated EGAs are reserved.

In some embodiments, the central controller may track player performance and/or progress within a game and may display the player's performance on the assembly and/or the corresponding EGA. For example, in some embodiments, assemblies of a configuration may be used in a tournament mode. In a tournament mode, a game is played on EGAs in which multiple players play the same game against or with one another. When assemblies are used in tournament mode, the central controller may track the performance of each player, and may control each assembly to display the corresponding player's progress or place in the game. For example, if a player is ⅔ of the way toward a goal, and the player is in first place, then corresponding assembly may display a progress bar that is ⅔ full and a message indication that the player is in first place, which may help the player and/or other players determine progress in the tournament game via the extended display (e.g., a leaderboard associated with the tournament may be displayed on the assembly and include one or more images associated with players in the tournament (e.g., pictures stored in respective player accounts associated with the players)).

In some embodiments, the central controller may prioritize (e.g., queue) content to display on an assembly when multiple contents to display are received at about the same time by the assembly. For example, the central controller may determine that a jackpot is presented at an EGA in a bank of assemblies at about the same time an advertisement is scheduled to be presented on the assemblies within the bank of assemblies. Accordingly, the central controller would determine that content corresponding to the jackpot should be displayed on the assemblies before the scheduled advertisement is displayed (e.g., based on rules stored in a memory). In another example, the central controller may determine that jackpots were presented on different EGAs in a bank of assemblies at about the same time. Accordingly, the central controller would determine video/animation sequences for each of the jackpots, and would determine an order in which to display the sequences (e.g., based upon rules stored in a memory—for example, a sequence associated with the most valuable jackpot first, a sequence associated with the first-occurring jackpot first, etc.). Thus, control of display on assemblies in a bank of assemblies is centrally controlled for seamless integration of more and/or less assemblies in the bank, as described herein.

In some embodiments, the central controller may control display on one or more assemblies in a bank of assemblies in order to present a game outcome of a game played on the corresponding EGA (e.g., as opposed to an outcome being determined, then presented on an EGA of an assembly, and then a "celebration" presented on/as traveling across all of assemblies in a bank). For example, a backend system (e.g., game processing backend system 314) may determine that a bonus should be presented at an EGA in a bank of assemblies, and the backend system may communicate to the central controller the EGA to which the bonus should be presented. The central controller may control the assembly corresponding to the randomly determined EGA at which the bonus should be presented to display an animation corresponding to the bonus such that the assembly (e.g., the housing and the EGA) presents an outcome of the game played on corresponding EGA (e.g., animations displayed on the EGA may appear to extend on to the assembly). In some embodiments, the central controller may control the assembly corresponding to the EGA at which the bonus should be presented to display an indication of the bonus on the housing of assembly prior to displaying an indication of the bonus on the EGA of the assembly. In some embodiments, the central controller may control the assembly corresponding to the EGA at which the bonus should be presented to only display an indication of the bonus on the corresponding housing and not on the corresponding EGA.

In other embodiments, a configuration or bank of assemblies may present an outcome of a game played on corresponding EGAs. For example, a backend system (e.g., game processing backend system 314) may determine that a bonus should be presented at a randomly determined EGA in a bank of assemblies, and the backend system may communicate the randomly determined EGA to which the bonus should be presented to the central controller. In order to communicate to the players which EGA the bonus will be presented at, the central controller may cause display of an animation traveling around/across the bank of assemblies, and ending at one housing or assembly—thereby communicating that the EGA associated with the housing assembly where the animation ended receives the bonus.

In some embodiments, animations may only be displayed at a subset of assemblies in a bank of assemblies. For example, for a smaller jackpot presentation, display of a celebratory animation may only be displayed on assemblies adjacent to the assembly where the jackpot is presented (e.g., only the assemblies directly next to the assembly where the jackpot is presented, and not other assemblies in the bank of assemblies). In another example, for a grand (larger) jackpot presentation, display of a celebratory animation may occur on all assemblies in the bank of assemblies.

Currently, certain challenges arise when positioning EGAs at a venue, for example on a casino floor. Floorspace is highly valuable and sought-after. Thus, it is beneficial to maximize floorspace with a variety of popular games. For example, currently, some popular games are included in a bank of EGAs with a shared "community" or common display above the bank of EGAs. As the games become more or less popular, there is no flexibility or little flexibility in changing the number of EGAs in the bank (e.g., the only options are to keep all EGAs and common displays or remove all EGAs and common displays—or remove some EGAs but keep the same large common display). Thus, improved and more flexible modular housing assemblies with EGAs are desired.

The modular housing assemblies with EGAs described herein are configured for tighter integration and packaging (e.g., more flexibility and a greater number of configurations) than currently known EGA signage assemblies in order to better utilize floorspace within a casino or other gaming establishment. For example, the modular housing assemblies may be configured as a standalone assembly, a connected or adjacent set of two housing assemblies, a connected or adjacent set of four housing assemblies, a connected or adjacent set of six housing assemblies, a connected or adjacent set of eight housing assemblies, etc. Thus, as games become more or less popular, more or less housing assemblies with EGAs may be connected or positioned near one another to form a space-saving configuration, as described herein, with flexibility in the shape and/or number of housing assemblies in order to maximize floorspace with currently popular games/machines.

Further, display improvements are provided with the modular housing assemblies described herein. For example, gameplay on one EGA or assembly may affect display on assemblies of other EGAs and/or the corresponding assemblies. In one example, a bonus may be presented on an EGA of one assembly, and an animation may appear on (e.g., or may transition between) all assemblies and/or EGAs in a bank of assemblies connected with the assembly of the EGA where the bonus was presented. In the example embodiment, display on the housings of the assemblies in a bank may be controlled by a single controller connected to the assemblies. For example, a local area network may be created between the EGAs, housings, and a central controller. A message broker component of the central controller may receive messages from the EGAs (e.g., or another server) regarding gameplay on the EGAs. Based upon certain events at at least one of the EGAs, the central controller may control display of certain messages, animations, video sequences, etc. on the assemblies and/or the corresponding EGAs. For example, the central controller may, based upon an event (e.g., gameplay related or not gameplay related (e.g., advertisements, animations to attract players, etc.)) at an EGA, determine a stored message/video sequence/animation to be displayed (e.g., also based upon a number of assemblies in a bank) that is associated with the event. The central controller may then communicate with one or more media players in order to control display of the determined message/video sequence/animation on at least one assembly in a bank of assemblies wherein an assembly includes an EGA and a housing. Such improvements may facilitate easier recognition of gameplay events by players via the expanded display.

In another example, the displayed content on an assembly or on multiple assemblies may be determined, for example, based on information from a player's profile that is entered by a player, thereby providing a more customized experience based on stored data. For example, if a player inputs player-specific information into their player profile (e.g., a favorite color, a first name, etc.) the content displayed may be based on the player-specific information. For example, the housing may display the player's first name in the player's favorite color (that the player previously input into their player profile) when the player used the corresponding EGA, which may facilitate easier determination by other players of which assemblies are currently in use and not available for play.

In yet another example, the central controller may determine the arrangement of assemblies in a bank, e.g., by determining positioning of the assemblies relative to one another via position sensors or signals received from EGAs or assemblies in a bank. Based on the determine configuration of the assemblies, the central controller may determine suitable content for display on the assemblies. For example, if there are only two assemblies in a bank, the central controller would not display content that requires a bank of four assemblies, thereby facilitating clarity and cohesion of the displayed content.

In yet another example, the displayed content may be based on whether or not an assembly is reserved for a player. For example, the displayed content on an assembly may indicate that the assembly is reserved, thereby facilitating easier recognition of reserved assemblies to players.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
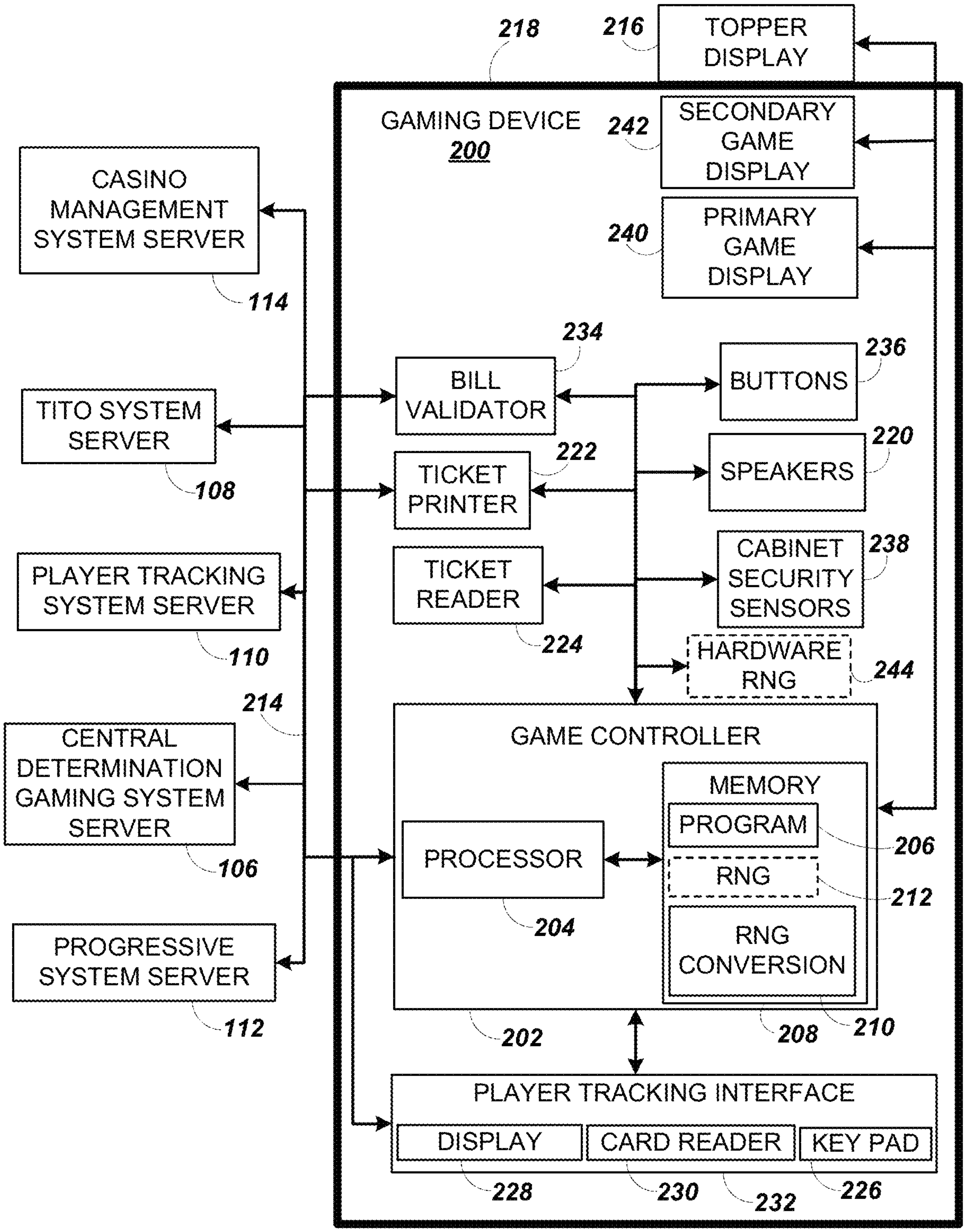
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display

128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
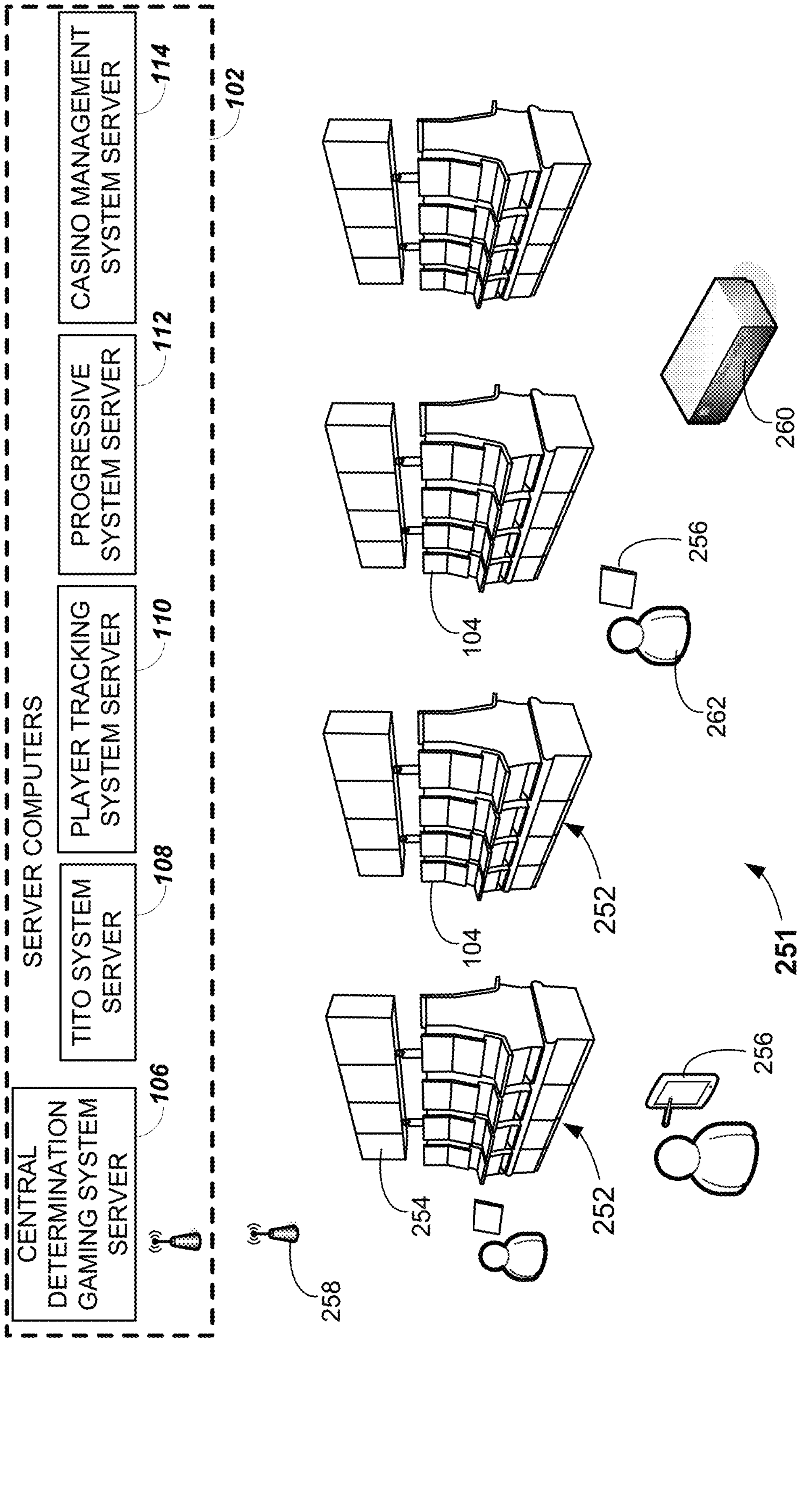
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
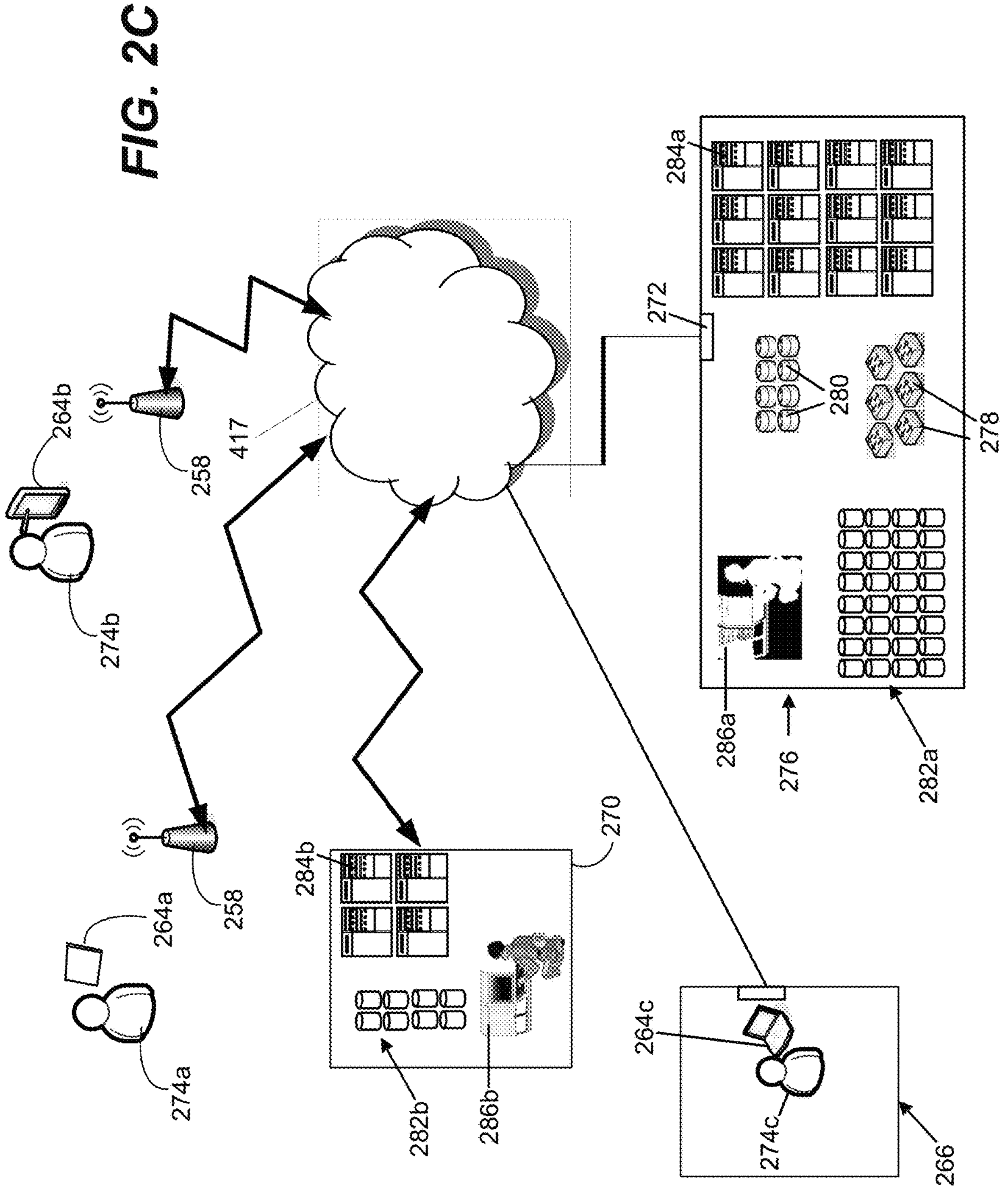
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication.

Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
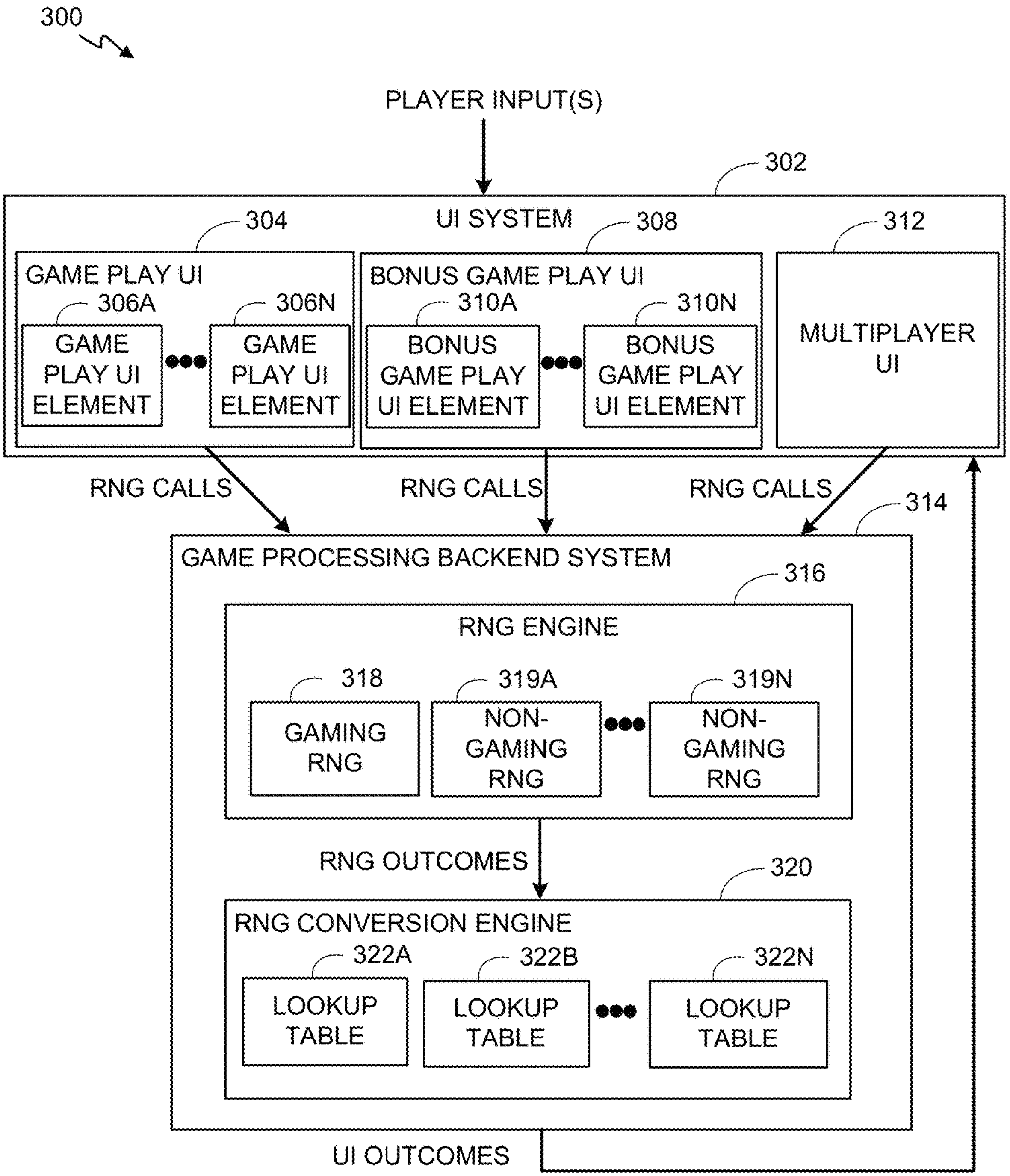
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
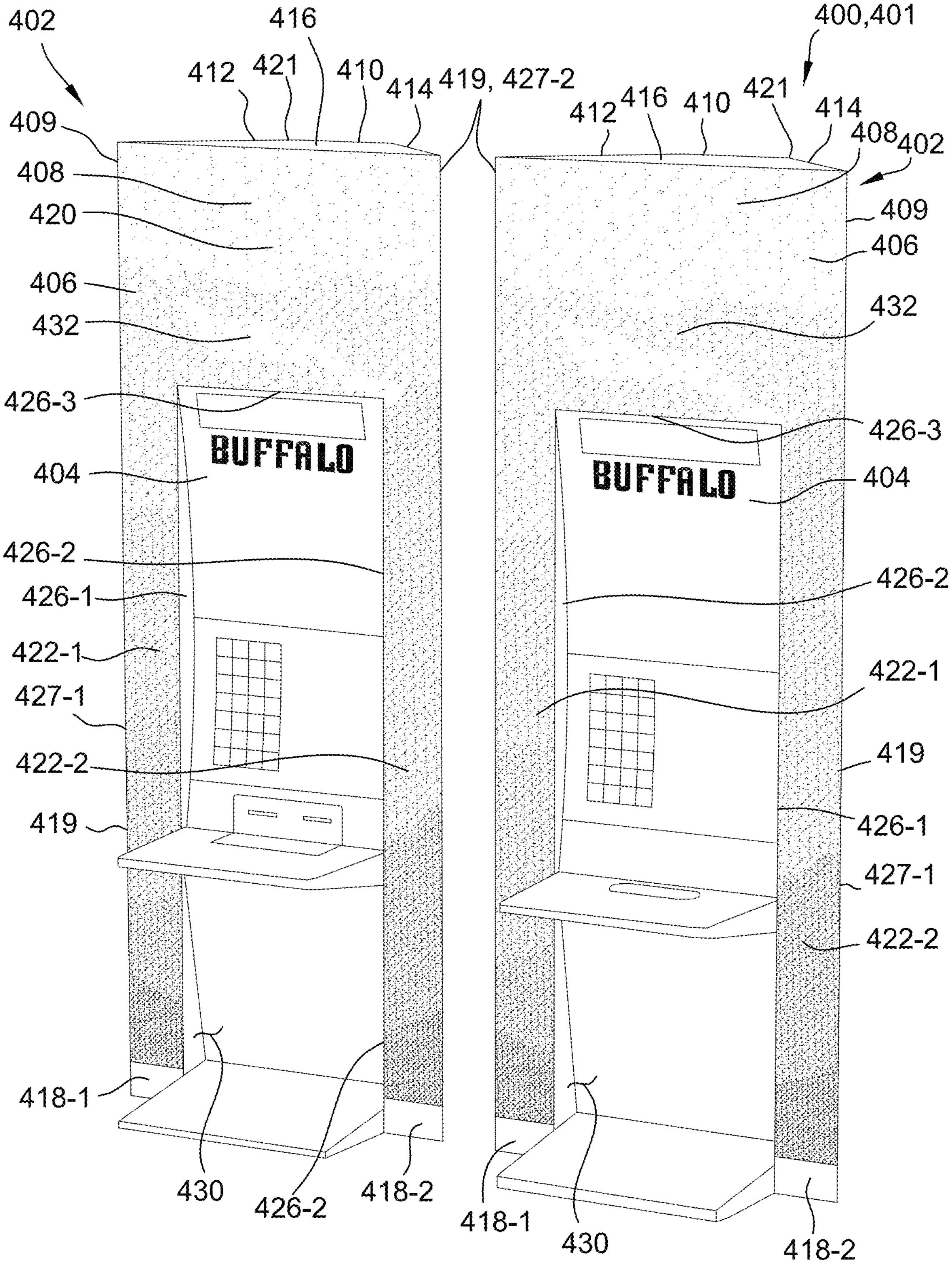
FIG. 4 illustrates an example configuration of modular housing assemblies as described herein.

FIG. 4 illustrates an example configuration 400 (e.g., a system 401) of modular housing assemblies 402 as described herein. As described herein, a "configuration" or "bank" of assemblies 402 may refer to a system (e.g., system 401) of one or more assemblies 402 and/or one or more modular housings 406. As shown, configuration 400 includes two assemblies 402. Each assembly 402 includes an EGA 404 (which may be, e.g., EGMs 104A-X, a kiosk, ATM, or any other electronic device that may be used within a casino environment or other area used for gameplay) and a housing 406. In some embodiments, assemblies 402 may be stand-alone assemblies 402 that are not part of the same system 401 (e.g., are not mechanically or electrically coupled together).

In the illustrated embodiment, EGAs 404 include C-shaped curve screens. In some embodiments, EGAs 404 may include any suitable screen shape, such as P-shaped screens, J-shaped screens, slat screens, that enable configuration 400 to function as described herein. In some embodiments, assemblies 402 or modular housings 406 may be included within a system 401 of assemblies 402 and/or modular housings 406.

In the illustrated embodiment, assemblies 402 are stand-alone assemblies (e.g., are not connected to or in communication with other assemblies 402). In some embodiments, assemblies 402 may be mechanically and/or electrically coupled together and/or may be in communication with each other, as described further herein.

In some embodiments, EGAs 404 may include any EGAs, including EGAs smaller or larger than those shown. For example, in embodiments where EGAs 404 are smaller than shown in FIG. 4, a filler (e.g., dark-colored plastic material) may surround EGAs 404 in order to fill empty space in the openings in housings 406 (e.g., the empty space being created by smaller EGAs 404 being inserted in the openings of housings 406). In another example, in embodiments where EGAs 404 are larger than shown in FIG. 4, housing 406 may be resized and reconfigured to surround EGAs 404.

In the illustrated embodiment, each modular housing 406 includes a front wall 408 (e.g., a front display wall), and at least one outer edge 409. At least one outer edge 409 may include a rear wall 410, two side walls 412, 414 (e.g., at least one side wall), a top wall 416, base portions 418, edges 419 formed at intersections between front wall 408 and side walls 412, 414 (e.g., a first side wall 412 and a second side wall 414), and edges 421 formed at intersections between rear wall 410 and side walls 412, 414. In the example shown, an acute angle α (shown in FIG. 5, e.g., 45 degrees) is formed between front wall 408 and side walls 412, 414, while an obtuse angle β (shown in FIG. 5, e.g., 135 degrees) is formed between rear wall 410 and side walls 412, 414. That is, at least one of first side wall 412 and second side wall 414 forms acute angle α with front wall 408.

In some embodiments, each wall 408, 410, 412, 414, 416 of assembly 402 may include at least one signage/display screen as described herein. In some embodiments, walls 408, 410, 412, 414, 416 of assembly 402 may be arranged in different configuration (e.g., in different shapes, in different sizes) than in the illustrated embodiment. For example, side walls 412, 414 may have different lengths and widths and may intersect front wall 408 and/or rear wall 410 at different angles, thereby resulting in a different size and/or configuration of top wall 416. In some embodiments, assembly 402 may include any suitable number of walls 408, 410, 412, 414, 416 (e.g., six walls, eight walls, ten walls, etc.) having any suitable configuration that enables configuration 400 to function as described herein.

In the illustrated embodiment, front wall 408 includes an upper portion 420, a first side portion 422-1, a second side portion 422-2, a first base portion 418-1, and a second base portion 418-2. Side portions 422-1, 422-2 extend downwards (e.g., depend) from upper portion 420 to first and second base portions 418-1, 418-2, respectively. A first inner edge 426-1 bounds first side portion 422-1 along with side wall 412 (at a second outer edge 427-1), upper portion 420, and base portion 418-1. A second inner edge 426-2 bounds second side portion 422-2, along with side wall 414 (at a second outer edge 427-2), upper portion 420, and base portion 418-2. Further, upper portion 420 is bounded by a third inner edge 426-3, top wall 416, and side walls 412, 414. The first inner edge 426-1 and the second inner edge 426-2 are operable to at least partially enclose EGA 404, and at least one outer edge 409 is operable to couple the modular housing 406 to at least one other modular housing 406.

In some embodiments, columns (not shown) may be positioned within housing 406 between side portions 422-1, 422-2 and corresponding portions of side walls 412, 414. Columns provide structural support for housing 406. In some embodiments, an outer profile of columns may conform to front wall 408 and respective side walls 412, 414. In some embodiments, columns may have any suitable size and configuration that enables configuration 400 to function as described herein.

In the example embodiment, an opening 430 is defined in housing 406 between upper portion 420, side portions 422-1, 422-2, base portions 418-1, 418-2 and the support surface (e.g., the ground). That is, opening 430 is formed between first, second, and third inner edges 426-1, 426-2, 426-3, and the support surface. Opening 430 is sized and configured to receive EGA 404 therein. In the illustrated embodiment, opening 430 is generally rectangular in shape. However, in some embodiments, opening 430 may be of any suitable size and configuration such that configuration 400 can function as described herein.

That is, in the example embodiment, modular housing 406 for EGA 404 includes front wall 408 including upper portion 420, first side portion 422-1, and second side portion 422-2. First and second side portions 422-1, 422-2 extend from upper portion 420 and at least partially define opening 430.

First and second side portions 422-1, 422-2 each have inner edge 426-1, 426-2, respectively, and outer edge 427-1, 427-2, respectively. First side wall 412 extends from outer edge 427-1 of first side portion 422-1, and second side wall 414 extends from outer edge 427-2 of second side portion 422-2. Opening 430 is sized to receive EGA 404.

In some embodiments, housing 406 and/or EGA 404 may include any kind of signage or display (e.g., fiber optics, LCD, LED, vinyl wrap with no electronic back lighting, etc.). In the example embodiment, front wall 408 includes at least one display 432 (e.g., a display panel or screen) that covers most of front wall 408, except for portions near the interface between front wall 408 and the support surface (e.g., near base portions 418-1, 418-2). Display 432 may be an LCD or LED display screen and/or panel, or may be any suitable kind of signage or display screen that enables configuration 400 to function as described herein. In some embodiments, display 432 may include a part or portion that is a touch screen interface that enables interaction from players with content displayed on display 432 In some embodiments, all of display 432 may be a touch screen interface.

In some embodiments, other walls (e.g., side walls 412, 414, top wall 416 and/or rear wall 410) may include any suitable signage or display, similar to display 432 of front wall 408. For example, in embodiments where assembly 402 is a stand-alone assembly 402, side walls 412, 414 and rear wall 410 will be visible to players and therefore may include at least one display similar to display 432 (e.g., a display panel or screen). Additionally, in some embodiments, top wall 416 may be visible to players in the venue (e.g., if the casino is two stories, then top wall 416 of assembly 402 on the first story may be visible from a balcony the second story). In such embodiments, it may be desirable to display content on all walls 408, 410, 412, 414, 416 of housing 406.

In some embodiments, each assembly 402 may include a corresponding sound system (not shown). Each sound system may include one or more speakers that are connected to corresponding assembly 402. Sound system provides sound complimentary to content displayed on corresponding assembly 402. Sound system may be controlled similar to content displayed on assemblies 402, as described further herein.

In the example embodiment, EGA 404 is configured to be positioned within housing 406 (e.g., housing 406 is placed and EGA 404 may be moved into opening 430, or “garage,” of housing 406). In some embodiments, housing 406 may be fixed to the ground via, e.g., bolted or screwed couplings. Fixing housing 406 to the ground may enable easier installation of EGA 404 within housing 406. In some embodiments, housing 406 is not fixed to the ground. EGA 404 may include transportation components (e.g., retractable wheels) that enable EGA 404 to be easily moved (e.g., rolled) to be positioned within opening 430 of housing 406. In some embodiments, EGA 404 does not include transportation components and is instead slid (e.g., pushed across the ground) or carried to be positioned within opening 430 of housing 406.

In some embodiments, housing 406 may be moved (e.g., slid or rolled) to surround EGA 404. In such embodiments, EGA 404 may be fixed to the ground via, e.g., a bolted or screwed coupling before moving housing 406 to surround EGA 404. Housing 406 may include transportation components (e.g., retractable wheels) coupled to base portions 418-1, 418-2 and/or walls 408, 410, 412, 414 that enable housing 406 to be easily moved (e.g., rolled) to at least partially enclose EGA 404. In some embodiments, housing 406 does not include transportation components and is instead slid (e.g., pushed across the ground) or carried to surround EGA 404.

In the example embodiment, EGA 404 is connected to housing 406 by electrical connections (e.g., ethernet, power, etc.) at the rear and/or bottom of EGA 404 and at the rear and/or bottom (e.g., base portions 418-1, 418-2) of housing 406. In some embodiments, EGA 404 may be wirelessly connected to housing 406 using a variety of wireless communication-based technologies, such as radio frequency (RF) (e.g., wireless fidelity (WiFi®) and Bluetooth®). For example, EGA 404 and housing 406 may include an antenna for facilitating wireless communication with each other and/or with other assemblies 402.

In the example embodiment, housing 406 and EGA 404 are connected by electrical connections (e.g., wires), but are not otherwise mechanically coupled together. That is, in the example embodiment, housing 406 may be movable relative to EGA 404 even after housing 406 is electrically connected to EGA 404 by electrical connections.

In some embodiments, in addition to being connected via electrical connections, housing 406 and EGA 404 are further mechanically coupled together. That is, modular housing 406 may be coupled to EGA 404. Housing 406 and EGA 404 may be mechanically coupled together via a bolted and/or screwed coupling. For example, base portions 418-1, 418-2 of housing 406 may include through holes or recesses that enable a fastener to mechanically couple housing 406 to EGA 404. Further, walls 408, 410, 412, 414 may include through holes or recesses therein that enable a fastener to mechanically couple housing 406 to EGA 404. In some embodiments housing 406 and EGA 404 are mechanically coupled together via a vice-grip coupling, nuts and bolts (e.g., a nut and bolt coupling), a screwed coupling, bungee-chord-like couplings (e.g., an elastic coupling), harness couplings etc. Housing 406 and EGA 404 may include any suitable components that facilitate any suitable mechanical coupling between housing 406 and EGA 404.

In the example embodiment, housing 406 and EGA 404 each include their own respective power cable and are coupled to different power sources (e.g., different electrical outlets). In some embodiments, housing 406 and EGA 404 may draw electrical power from one another via wired electrical connections between housing 406 and EGA 404 and/or via wireless power transfer between housing 406 and EGA 404. In such embodiments, only one of housing 406 and EGA 404 require an electrical connection to a power source in order to power both housing 406 and EGA 404. In embodiments relying on wireless power transfer, housing 406 and EGA 404 may include suitable components (e.g., wire coils) for facilitating wireless power transfer.

In some embodiments, at least one of first side wall 412 and second side wall 414 of modular housing 406 is configured to be positioned adjacent to side wall 412, 414 of another modular housing 406 to form a side-by-side configuration of two modular housings 406. With reference to FIG. 4, such a side-by-side configuration may include both housings 406 (or assemblies 402) arranged as shown in FIG. 4 (e.g., with edge 419 of side wall 414 of housing 406 on the left of FIG. 4 adjacent to edge 419 of side wall 412 of housing 406 on the right of FIG. 4). In some embodiments, edges 419 of housings 406 may be brought closer together and coupled together, as described further herein, to form the side-by-side configuration.

In some embodiments, first side wall 412 and second side wall 414 of modular housing 406 (or assembly 402) may be configured to be positioned adjacent to side walls 412, 414 of other modular housings 406 to form a side-by-side configuration (e.g., system 401) of two or more modular housings 406 (or assemblies 402). That is, a second modular housing 406 (or assembly 402) may be positioned adjacent to a first modular housing 406 (or assembly 402) to form a side-by side configuration (e.g., system 401) of two modular housing assemblies 406 (or assemblies 402). System 401 may define a flat rear surface (e.g., rear wall 410 of each modular housing 406) that facilitates positioning system 401 against a wall of a venue.

Figure 6:
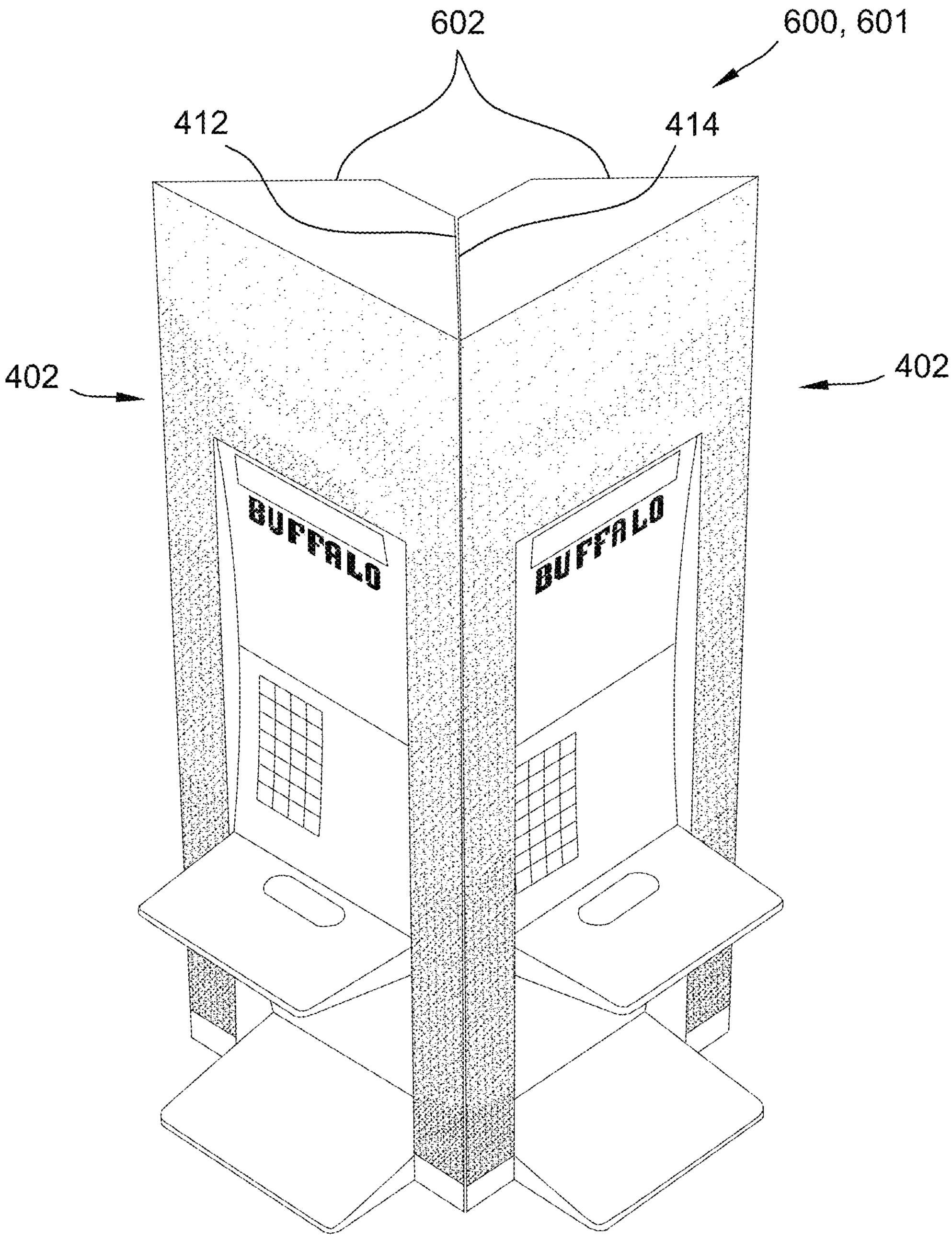
FIG. 6 illustrates another example configuration of modular housing assemblies as described herein.

In some embodiments, at least one of first side wall 412 and second side wall 414 of modular housing 406 (or assembly 402) is configured to be positioned adjacent to side wall 412, 414 of another modular housing 406 (or assembly 402) to form a perpendicular configuration (e.g., system 401) of two modular housings 406 (or assemblies 402), as shown in, e.g., FIG. 6. That is, modular housing 406 (or assembly 402) is positioned a right angle to another modular housing 406 (or assembly 402) to form a perpendicular configuration (e.g., system 401) of two modular housings 406 (or assemblies 402).

Figure 7:
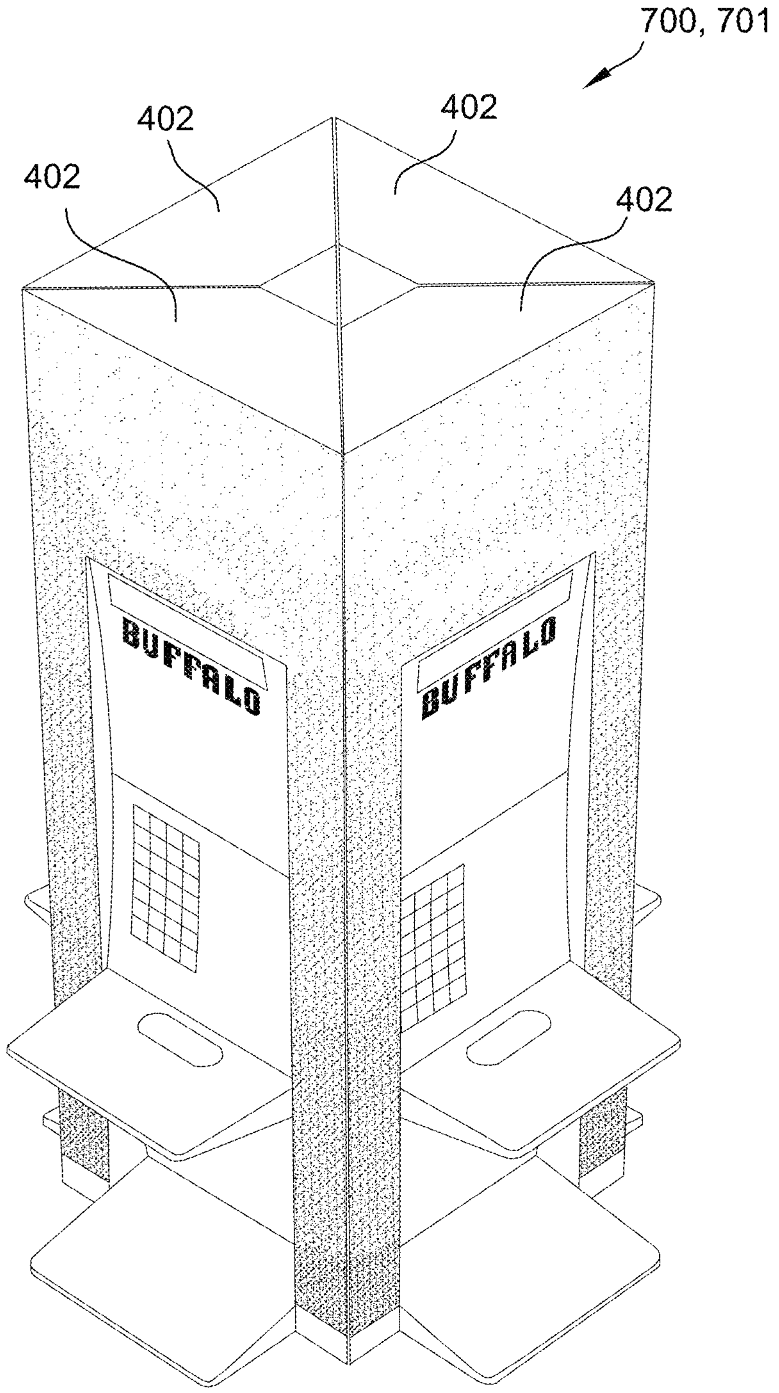
FIG. 7 illustrates another example configuration of modular housing assemblies as described herein.

In some embodiments, first side wall 412 and second side wall 414 of modular housing 406 (or assembly 402) are configured to be positioned adjacent to side walls 412, 414 of other modular housings 406 (or assemblies 402) to form a square configuration (e.g., system 401) of four modular housings 406 (or assemblies 402), as shown in, e.g., FIG. 7. That is, system 401 may include four modular housings 406 (or assemblies 402) arranged in a square configuration.

Figure 8:
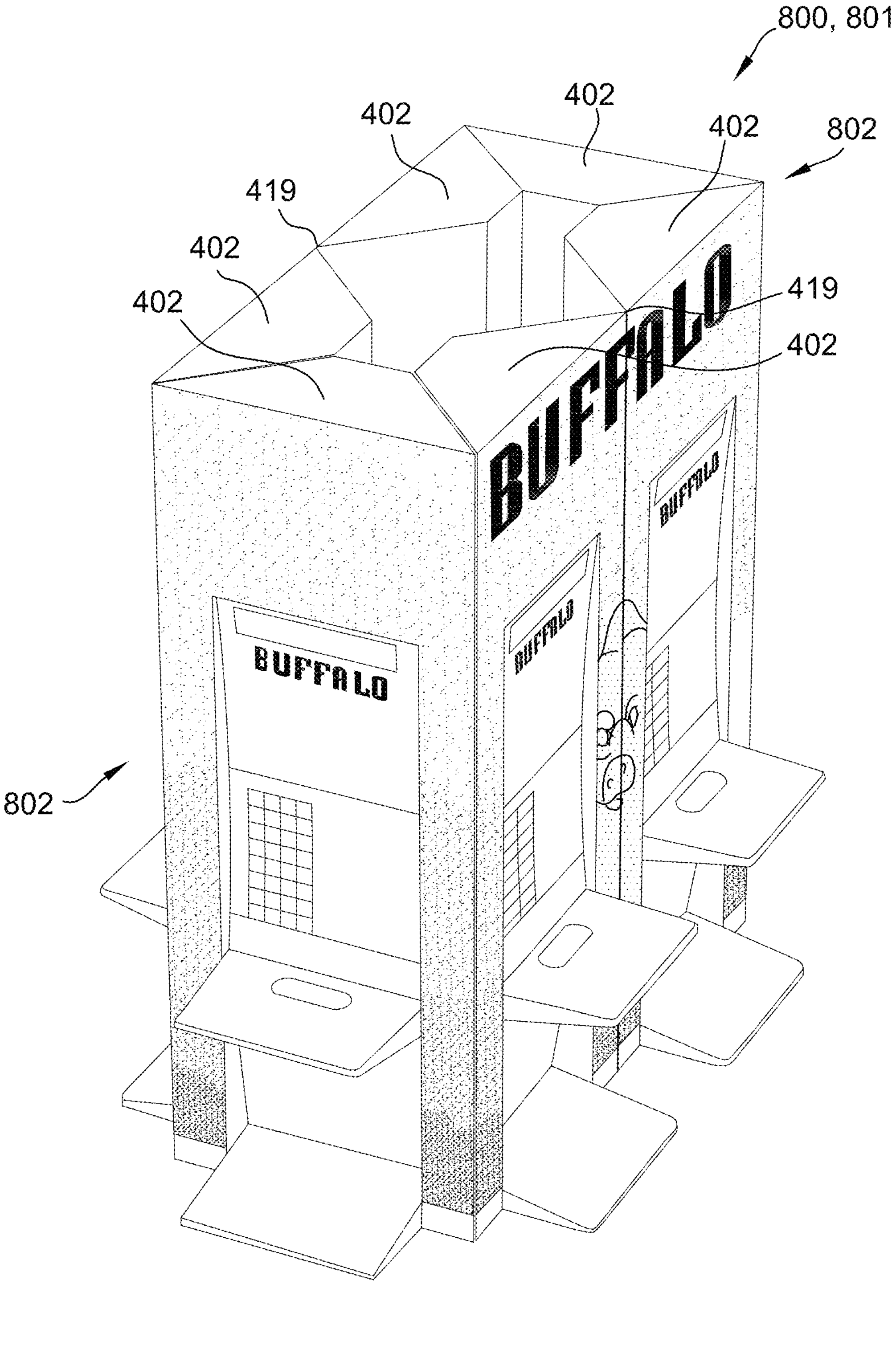
FIG. 8 illustrates another example configuration of modular housing assemblies as described herein.

In some embodiments, first side wall 412 and second side wall 414 of modular housing 406 (or assembly 402) are configured to be positioned adjacent to side walls 412, 414 of other modular housings 406 (or assemblies 402) to form a rectangular configuration of more than four modular housings 406 (or assemblies 402), as shown in, e.g., FIG. 8.

Figure 9:
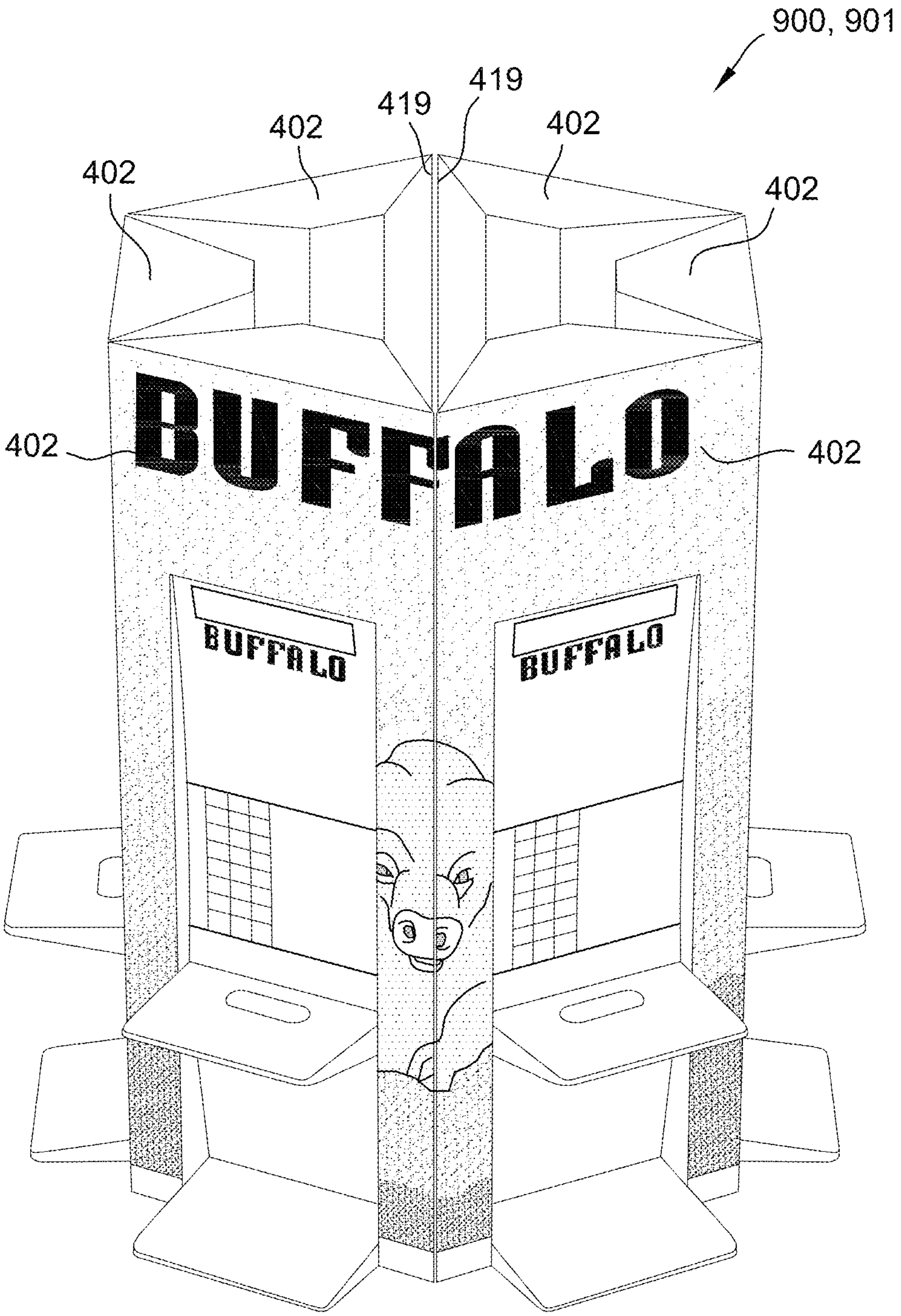
FIG. 9 illustrates another example configuration of modular housing assemblies as described herein.

In some embodiments, first side wall 412 and second side wall 414 of modular housing 406 (or assembly 402) are configured to be positioned adjacent to side walls 412, 414 of other modular housings 406 (or assemblies 402) to form a hexagonal configuration of six modular housings 406 (or assemblies 402), as shown, e.g., in FIG. 9.

In some embodiments, first side wall 412 and second side wall 414 of modular housing 406 (or assembly 402) are configured to be positioned adjacent to side walls 412, 414 of other modular housings 406 (or assemblies 402) to form a configuration of more than six modular housings 406 or assemblies 402.

In some embodiments, modular housing 406 is in communication with a central controller (e.g., a server 102 and/or game controller 202) including a processor coupled to at least one memory device, and the central controller is in communication with a backend server (e.g., server 102 and/or a server similar to server 102) that provides at least one advertisement to display on the modular housing 406 to the central controller. The central controller may control modular housing 406 to display the at least one advertisement.

In some embodiments, perpendicular system 401 of two modular housings 406 (or assemblies 402) includes a third modular housing 406 (or assembly 402) and a fourth modular housing 406 (or assembly 402) coupled to system 401. The third modular housing 406 (or assembly 402) may be coupled to the first modular housing 406 (or assembly 402) and the fourth modular housing 406 (or assembly 402) may be coupled to the second modular housing 406 (or assembly 402). The first, second, third, and fourth modular housings 406 (or assemblies 402) may be arranged in a square configuration (e.g., similar to system 701 shown in FIG. 7).

Modular housing assemblies 402 described herein are configured for tighter integration and packaging (e.g., more flexibility/a greater number of possible configurations) than currently known EGAs and/or EGA assemblies in order to better utilize floorspace. For example, assemblies 402 may be configured as a standalone assembly or side-by-side (e.g., FIG. 4), a connected/adjacent set of two assemblies (e.g., FIG. 6), a connected/adjacent set of four assemblies (e.g., FIG. 7), a connected/adjacent set of six assemblies (e.g., FIGS. 8 and 9), a connected/adjacent set of eight assemblies, etc. The configuration of walls 408, 410, 412, 414, relative to one another facilities forming a wide-variety of geometrical configurations of assemblies 402. Thus, as games become more or less popular, more or less assemblies 402 may be connected, as described herein, with flexibility in the shape of the bank of assemblies 402 and/or the number of assemblies 402 in order to maximize floorspace with currently popular games/machines.

Figure 5:
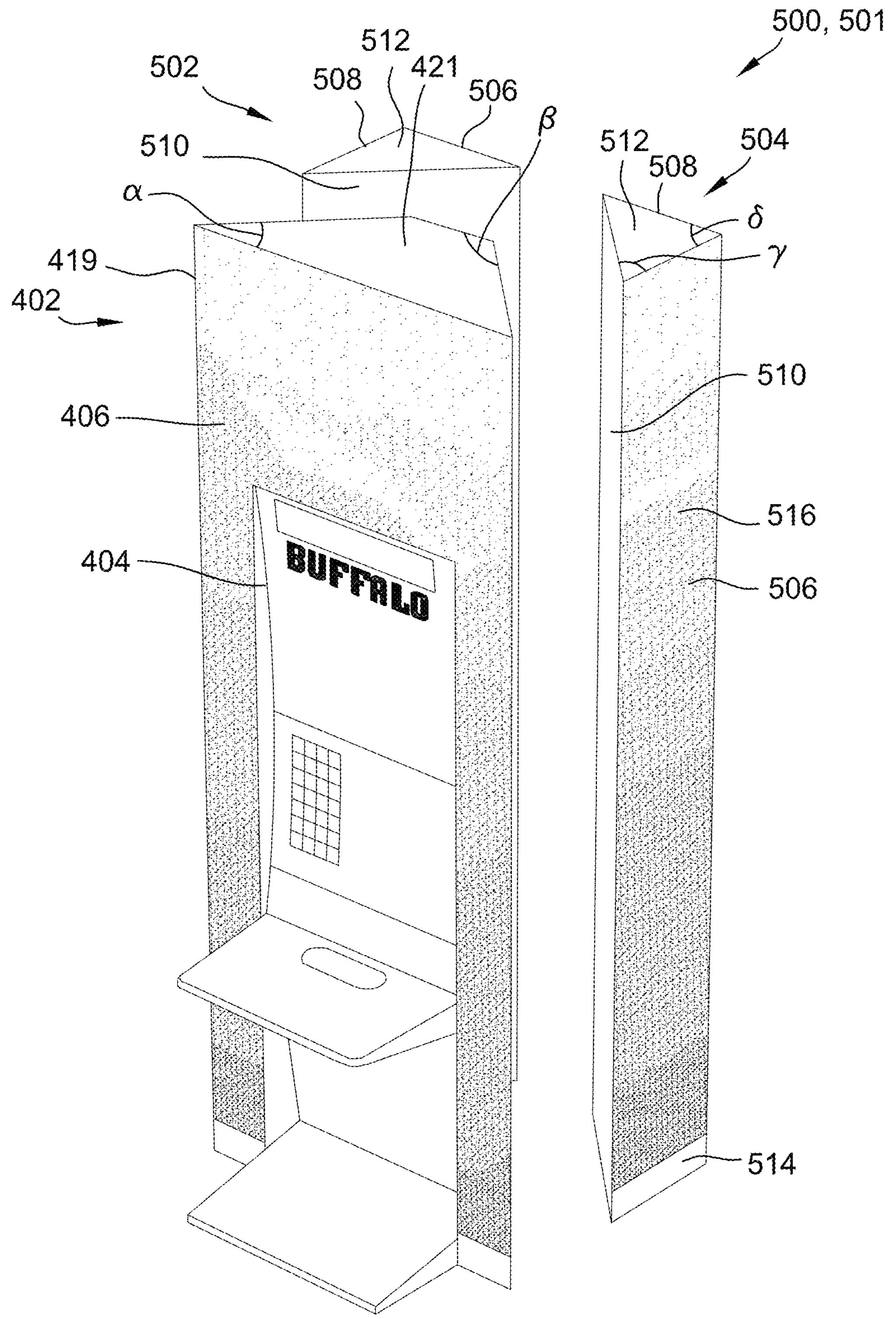
FIG. 5 illustrates an example configuration of a modular housing assembly and display components as described herein.

FIG. 5 illustrates an example configuration 500 (e.g., system 501) of a modular housing assembly 402 as described herein. As shown in FIG. 5, configuration 500 includes assembly 402 (e.g., EGA 404 and housing 406), along with additional signage or display components 502, 504. The shape of components 502, 504 are configured as three-sided components including acute angles between each side (e.g., forming a prism shape) to allow for tight assembly with assembly 402 (e.g., the angles of assembly 402 and components 502, 504 are configured such that adjacent sides of assembly 402 and components 502, 504 form approximately 90 degree or 180-degree angles such that continuous flat surfaces are created). That is, at least one of first side wall 412 and second side wall 414 of modular housing 406 (or assembly 402) is configured to be positioned adjacent to component 502 or 504 that includes a side wall (e.g., side wall 506 or 508), such that side wall 506 or 508 of component 502 or 504 forms a right angle with front wall 408 of modular housing 406 (or assembly 402).

In the illustrated embodiment, components 502, 504 each include two side walls 506, 508, a rear wall 510, a top wall 512, and a base portion 514. In the example shown, an acute angle $\gamma$ (e.g., 45 degrees) exists between side walls 506, 508 and rear wall 510, while a right angle $\delta$ (e.g., 90 degrees) exists between side walls 506, 508.

In some embodiments, each wall of components 502, 504 may include a signage/display as described herein. In some embodiments, walls 506, 508, 510, 512 of components 502, 504 may be arranged in different configurations (e.g., in shapes and/or sizes) than the examples shown. For example, side walls 506, 508 may be of different lengths and/or widths and may intersect rear wall 510 and/or each other at different angles. In yet some embodiments, components 502, 504 may include any suitable number of walls 506, 508, 510, 512 (e.g., six walls, eight walls, etc.) having any suitable configuration that enables configuration 500 to function as described herein. The shapes and angles of the example assemblies 402 and components 502, 504 described herein are configured to facilitate tight/condensed integration and packaging, with each other and/or with assemblies 402, as described herein.

In the example embodiment, similar to front wall 408 of housing 406, side walls 506, 508 of components 502, 504 each include a display 516 that extends from top wall 512 toward base portion 514. In the example embodiment, display 516 covers most of side walls 506, 508, except for portions near the interface between side walls 506, 508 and the support surface (e.g., at base portion 514). Similar to display 432, display 516 may be an LCD or LED display screen, or may be any suitable kind of signage or display screen that enables configuration 500 to function as described herein. In the illustrated embodiment, only side walls 506, 508 include display 516. However, in some embodiments, any wall (e.g., side walls 506, 508, top wall 512, rear wall 510) of components 502, 504 may include one or more displays 516.

In the illustrated embodiment, components 502, 504 are shown as being spaced apart from assembly 402. In such embodiments, side walls 506, 508 and rear wall 510 of components 502, 504 may each be visible to players and may each include display 516, thereby facilitating a continuous display around each of components 502, 504. In some embodiments, only side walls 506, 508 of components 502, 504 include display 516, and displays 516 of components 502, 504 facilitate extending display 516 of housing 406 and/or or display on EGA 404.

In some embodiments, components 502, 504 may be abutted against and/or coupled to assembly 402. That is, in some embodiments, components 502, 504 may not be spaced apart from assembly 402. For example, rear wall 510 of components 502, 504 may be abutted against and/or coupled to respective side walls 412, 414 of housing 406, thereby creating a substantially continuous, flat rear surface (e.g., side walls 506, 508 of components 502, 504 and rear wall 410 of housing) and a flat side surface (e.g., side walls 506, 508 of components 502, 504 when components 502, 504 are abutted against assembly 402) to fit flat against a surface (e.g., a wall or an adjacent machine), which facilitates tighter packing of assemblies 402 and components 502, 504 and better utilization of floor space. In such embodiments, displays 516 of components 502, 504 and display 432 of housing 406 may create a substantially continuous display around configuration 500.

Components 502, 504 may be coupled to assembly 402 to facilitate a tight fight (e.g., minimal space) between assembly 402 and components 502, 504, thereby creating a substantially continuous display surface (e.g., with display 432 of housing 406 and display(s) 516 of components 502, 504). For example, components 502, 504 may be coupled to assembly 402 via a bolted or screwed coupling, with each of assembly 402 and/or components 502, 504 including suitable components (e.g., mounting plates) for coupling components 502, 504 to assembly 402, or vice-versa. That is, components 502, 504 may be coupled to assembly 402 in any suitable manner, (e.g., via nuts and bolts, screws, vice grips, bungee-chord-like (e.g., elastic) configuration, harness couplings, hinges etc.) that enables configuration 500 to function as described herein.

Components 502, 504 may be in communication with assembly 402. In some embodiments, components 502, 504 may be connected to assembly 402 by mechanical electrical connections (e.g., ethernet chord, power cord, etc.) at the rear and/or bottom of assembly 402 (e.g., at base portions 518-1, 418-2) and at the rear and/or bottom (e.g., base portions 514) of components 502, 504. In some embodiments, components 502, 504 may be wirelessly connected to assembly 402 using a variety of wireless communication-based technologies, such as radio frequency (RF) (e.g., wireless fidelity (WiFi®) and Bluetooth®). For example, components 502, 504 and assembly 402 may include an antenna (not shown) for facilitating wireless communication with each other.

In the example embodiment, housing 406 and components 502, 504 each include their own respective power cables and are coupled to different power sources (e.g., different electrical outlets). In some embodiments, housing 406 and components may draw electrical power from one another via wired electrical connections between housing 406 and components 502, 504 or via wireless power transfer between housing 406 and components 502, 504. In such embodiments, only one of housing 406 and components 502, 504 require an electrical connection to a power source in order to power both housing 406 and components 502, 504. In embodiments relying on wireless power transfer, assembly 402 and components 502, 504 may include suitable components (e.g., wire coils) for facilitating wireless power transfer.

In the example embodiment, components 502, 504 are controlled by the same central controller as assembly 402. That is, content displayed on components 502, 504 and content displayed on assembly 402 are controlled via the same central controller. According to the example embodiment, the central controller can facilitate a continuous display between components 502, 504 and assembly 402 and/or the central controller can facilitate separate displays on each of components 502, 504 and/or on assembly 402. The central controller may also detect the position of components 502, 504 relative to assembly 402 (e.g., using position sensors) in order to determine content to display on components 502, 504 and/or on assembly 402. As described herein, position sensors may refer to, for example, a global positioning system (GPS) sensor, ultrasonic position sensor, or any other suitable position sensor that facilitates determining the position on one object relative to another object. Assembly 402 (e.g., housing 406 and/or EGA 404) and/or components 502, 504 may include position sensors.

In some embodiments, if the central controller detects that components 502, 504 are near assembly 402 (e.g., based on signals from one or more sensors if components 502, 504 are abutted against assembly 402), then central controller may determine that content should be continuously displayed between components 502, 504 and assembly 402. In contrast, if the central controller detects that components 502, 504 are spaced apart from assembly 402, then central controller may determine that content should be separately displayed (e.g., not continuously displayed) on components 502, 504 and assembly 402. In some embodiments, components 502, 504 may be controlled by a different central controller than assembly 402, in addition or alternatively to central controller that controls assembly 402. In some embodiments, components 502, 504 may be controlled by the backend server (e.g., server 102) or may be controlled by a central controller local to corresponding assembly 402.

In the example embodiment, the central controller controlling assembly 402 may track gameplay on EGA 404 (e.g., via signals sent from EGA 404 or a server or other device to the central controller) in order to determine what to cause display of on housing 406 and components 502, 504. For example, if a player receives a jackpot while playing a game on EGA 404, a signal is sent to the central controller indicating that the jackpot was received. Based on the signal, the central controller may determine that content corresponding to the jackpot should be displayed on assembly 402 and/or on components 502, 504. If components 502, 504 are abutted to assembly 402, as described above, the central controller may detect this configuration and may determine that content corresponding to the jackpot should be continuously displayed between assembly 402 and components 502, 504. In some embodiments, components 502, 504 may include other similar display capabilities to those described herein for assembly 402.

FIG. 6 illustrates another example configuration 600 (e.g., system 601) of modular housing assemblies 402 as described herein. As shown in FIG. 6, two assemblies 402 are arranged with a substantially flat rear surface 602 (e.g., to facilitate positioning system 601 against a wall of a venue). That is, assemblies 402 are arranged such that side wall 412 of one assembly 402 abuts against side wall 414 of the other assembly 402. In the illustrated embodiment, side walls 412 of one assembly 402 and side wall 414 of other assembly 402 define substantially flat rear surface 602. The resulting configuration of rear surface 602 (e.g., being substantially flat) facilitates placement of the configuration 600 against a wall, for example, which can help conserve space within a venue.

In the example embodiment, assemblies 402 are electrically coupled together via, e.g., wires, but are not otherwise mechanically coupled together. That is, assemblies 402 are pushed together into the illustrated configuration, but are not further secured together other than via electrical connections. In some embodiments, assemblies 402 may be further mechanically coupled together, e.g., via a fastener coupling. In such embodiments, assemblies 402 include suitable components (e.g., mounting plates) that facilitate coupling of assemblies 402 via fasteners (e.g., nuts and bolts, screws, etc.). In some embodiments, assemblies may be coupled together in any suitable manner (e.g., using fasteners, a vice grip coupling, bungee-chord-like configuration, a harness coupling, hinges etc.) to facilitate a tight fit between assemblies 402 (e.g., for substantially continuous display of animations across/between assemblies 402) that enables configuration 600 to function as described herein.

In the example embodiment, assemblies 402 may be in communication with each other. In some embodiments, assemblies 402 are connected by wired electrical connections (e.g., ethernet, power, etc.) at the rear and/or bottom of assemblies 402 (e.g., base portions 418-1, 418-2). In some embodiments, assemblies 402 may be wirelessly connected together using a variety of wireless communication-based technologies, such as radio frequency (RF) (e.g., wireless fidelity (WiFi®) and Bluetooth®). For example, assemblies 402 may include an antenna (not shown) for facilitating wireless communication with each other.

In the example embodiment, assemblies 402 are controlled by the same central controller. That is, content displayed on assemblies 402 are controlled via the same central controller. According to the example embodiment, the central controller can facilitate a continuous display between assemblies 402 and/or the central controller can facilitate separate displays on each separate assembly 402. The central controller may also detect the position of assemblies 402 relative to one another (e.g., using position sensors, as described above) in order to determine content to display on assemblies 402. For example, if the central controller detects that assemblies 402 are near each other (e.g., if assemblies 402 are abutted against one another), then the controller may determine that content should be continuously displayed between assemblies 402. In contrast, if the central controller detects that assemblies are spaced apart from each other, then the central controller may determine that content should be separately displayed (e.g., not continuously displayed) on assemblies 402. In some embodiments, assemblies 402 may be controlled by different central controllers. For example, each assembly 402 may be controlled via a central controller that is local to each assembly 402 and/or to each EGA 404. In some embodiments, assemblies 402 may be controlled by a backend server (e.g., server 102).

In the example embodiment, the central controller controlling each configuration 600 (e.g., bank) of assemblies 402 may track gameplay on corresponding EGAs 404 (e.g., via signals sent from corresponding EGAs 404 or a server or other device to the central controller) in order to determine what to cause display of on assemblies 402. For example, if a player receives a jackpot while playing a game on one EGA 404 in the bank of assemblies 402, a signal is sent to the central controller indicating that the jackpot was received. Based on the signal, the central controller may determine that content corresponding to the jackpot should be continuously displayed on all assemblies 402 in configuration 600 (e.g., if the central controller detects that all assemblies 402 in the bank are close together).

FIG. 7 illustrates another example configuration 700 (e.g., system 701) of modular housing assemblies 402 as described herein. As shown in FIG. 7, four assemblies 402 are arranged in a square-like shape. That is, side walls 412, 414 of each assembly 402 are abutted against side walls 412, 414 of an adjacent assembly 402, thereby forming a compact arrangement (e.g., bank) of four assemblies 402. The connections (e.g., mechanical couplings and electrical connections) between each of the assemblies 402 are similar to those described for assemblies 402 of configuration 600 above. However, in configuration 700, assemblies 402 may be further mechanically coupled together. For example, rear wall 410 of each assembly 402 may be coupled to rear wall 410 of assembly 402 that is directly behind that assembly 402 in the illustrated configuration, which facilitates increased mechanical stability of configuration 700 and can help present assemblies 402 from falling over.

FIG. 8 illustrates another example configuration 800 (e.g., system 801) of modular housing assemblies 402 as described herein. As shown in FIG. 8, six assemblies 402 are arranged in a rectangle-like shape. That is, six assemblies 402 are abutted against each other. In the illustrated embodiment, two pods 802 of abutted assemblies 402 are formed, with pods 802 abutted together to form configuration 800. To form pod 802, side walls 412, 414 of one assembly are each abutted against side wall 412 or side wall 414 of another assembly, thereby forming a set of three assemblies 402 arranged in a U-shape. Then pods 802 are abutted together such that assemblies 402 form a continuous display around configuration 800 (e.g., the bank). That is, pods 802 are abutted together at the intersection between front wall 408 and free side wall 412, 414 (e.g., edge 419) of assemblies that form the free ends of each U-shaped pod 802.

The connections (e.g., mechanical couplings and electrical connections) between each of assemblies 402 in configuration 800 are similar to those described for assemblies 402 of configuration 600 described above. However, in configuration 800, assemblies 402 may be further coupled together. For example, rear wall 410 of each assembly 402 may be coupled to rear wall 410 of assembly 402 that is directly behind assembly 402 in the illustrated configuration, which facilitates increased stability of configuration 700 and can help present assemblies 402 from falling over. Additionally, configuration 700 may facility display of additional content that is not available to display on other configurations (e.g., configurations 600, 700) due to the additional assemblies 402 in configuration 800 and additional adjacent assemblies 402 in configuration 800 which provide additional space for display, as described further herein.

FIG. 9 illustrates another example configuration 900 (e.g., system 901) of modular housing assemblies 402 as described herein. As shown in FIG. 9, six assemblies 402 are arranged in a hexagon-like shape. That is, six assemblies 402 are abutted against each other such that each edge 419 of each assembly 402 abut against edge 419 of an adjacent assembly 402.

The connections (e.g., mechanical couplings and electrical connections) between each of the assemblies 402 in configuration 900 are similar to those described for assemblies 402 of configuration 600 described above. However, in configuration 800, assemblies 402 may be further coupled together. For example, rear wall 410 of each assembly 402 may be coupled to rear wall 410 of assembly 402 that is directly behind assembly 402 in the illustrated configuration, which facilitates increased stability of configuration 900 and can help present assemblies 402 from falling over. Additionally, configuration 900 may facilitate display of additional content that is not available to display on other configurations (e.g., configurations 600, 700) due to the additional assemblies 402 in configuration 800 and/or the hexagonal arrangement of assemblies 402 which provide additional space for display.

Notably, FIGS. 6-9 illustrate different embodiments of arranging the same assemblies 402 with each other (e.g., in a configuration or bank). As described herein, assemblies 402 may also be configured as standalone assemblies. Because of the trapezoid-like shape of assemblies 402 (e.g., approximately 45-degree angles $\alpha$ between front wall 408 of assembly 402 and side walls 412, 414 of assembly 402 and approximately 135-degree angles $\beta$ between rear wall 410 and side walls 412, 414 of assembly 402), assemblies 402 may be flexibly configured in a variety of shapes to provide more customization/efficiency in venue/casino floorplan design. In other words, each assembly 402 may serve as a "building block" for a larger bank of assemblies, or as a standalone assembly to facilitate the addition and/or removal of assemblies associated with a game as the game becomes more or less popular, and therefore is more or less desirable to have on a venue (e.g., casino) floor.

In the example embodiment, when adding an assembly 402 to a configuration or bank (e.g., configurations 400, 500, 600, 700, 800, 900) or when forming a configuration of assemblies 402, the desired number of assemblies 402 are arranged in the desired pattern, and are all coupled to the same central controller (e.g., via wired or wireless connection), such that the same central controller controls content displayed on all assemblies 402 in the configuration or bank. In some embodiments, each assembly 402 in the configuration may be connected to a backend server (e.g., server 102) that controls content to display on each assembly 402 in the configuration or bank. In some embodiments each assembly 402 within a configuration includes its own central controller (e.g., a central controller within corresponding EGA 404) that controls content displayed on each individual assembly, such that there is no correlation and/or synchronization between content displayed on each assembly 402 in the configuration or bank.

In the example embodiment, display on housings 406 of assemblies 402 in a bank (e.g., configuration) may be controlled by a single central controller (e.g., a server 102 and/or game controller 202) connected to assemblies 402. Central controller may have a similar configuration to game controller 202, as shown in FIG. 2A (e.g., central controller includes a processor coupled to at least one memory device). However, central controller may control a bank or configuration or system of multiple assemblies 402 and/or modular housings 406. A local area network may be created between EGAs 404, housings 406, and the central controller. The central controller may include a processor coupled to at least one memory device. A message broker component of the central controller may receive messages from EGAs 404 (or another server, e.g., server 102) regarding gameplay on EGAs 404 when determining content to display on assemblies 402.

Although in the example embodiment, the central controller is described as a hardware component being in communication with and controlling a configuration or bank of assemblies 402, the central controller could also be a backend server or controller (e.g., server 102) connected to and controlling a bank or configuration of modular housing assemblies and/or electronic gaming assemblies. In some embodiments, the central controller may also be local to each assembly 402 such that each assembly 402 (including assemblies 402 in the same configuration or bank) is individually controlled by a different central controller. For example, the central controller could be a component of EGA 404 of assembly 402, with the central controller only controlling EGA 404 to which it belongs and corresponding assembly 402.

Display improvements are provided with assemblies 402. The central controller may control display of certain messages, animations, video sequences, etc. on assemblies 402 (e.g., EGAs 404 and/or housings 406). For example, gameplay on one EGA 404 may affect display on corresponding assembly 402 or other assemblies 402. That is, display on one EGA 404 or one assembly 402 may affect display on other assemblies 402. In one example, a bonus may be presented on an EGA 404 of one assembly 402, and an animation may appear on (e.g., or may transition between) all assemblies 402 in a bank or configuration of assemblies (e.g., as shown in FIGS. 6-9) connected with the assembly 402 where the bonus was presented. That is, the central controller monitors gameplay on EGA 404, and, when a bonus is presented on EGA 404, the central controller controls all assemblies 402 connected to the central controller to display an animation (or a part of an animation if, e.g., the animation is continuously displayed on more than one assembly 402) based on the jackpot.

Similar to display improvements, sound improvements are also provided with assemblies 402. Sound system of assemblies 402 is controlled similarly to content displayed on assemblies 402 (e.g., via a common central controller, via a backend server, and/or via an individual central controller). In the example embodiment, the central controller controls sound systems of a bank or configuration of assemblies 402 with which the central controller is in communication. The central controller may control sound systems of assemblies 402 to produce the same sound when the same content is displayed on assemblies 402. For example, if a bonus is presented on an EGA 404 of one assembly 402 and an animation is displayed on all assemblies 402 connected to the same central controller as the one assembly 402 on which the bonus is presented, then sound systems of all assemblies 402 connected to the same central controller as the one assembly 402 on which the bonus is presented all produce the same sound effects corresponding to the animation. In some embodiments (e.g., during normal gameplay), sound system of corresponding assembly 402 only produces sounds specific to corresponding assembly 402.

Generally, when assemblies 402 are controlled to display the same animation (or to work together to continuously display an animation), then sound systems corresponding to those assemblies 402 produce the same sounds, or produce sounds corresponding to a portion of the animation the is currently displayed on corresponding assembly 402. For example, if a bonus is presented on EGA 404 of one assembly 402, all other assemblies 402 connected to the same central controller (e.g., in the same bank) may display a similar, continuous animation that features an object flying/transitioning across all assemblies 402 in the bank. In such an embodiment, sound system of all assemblies 402 connected to the same central controlled may produce the same background sound (e.g., music) corresponding to the animation, and may additionally produce a sound corresponding to the position of the flying object. For example, a sound of an object flying by may be produced by each individual assembly 402 when the flying object is displayed on that assembly 402. In some embodiments, sound system may produce any suitable sounds at any suitable time such that assemblies 402 can function as described herein.

In the example embodiment, the controller determines which game (or games) are played on the assembles 402 connected to the controller and how many assemblies 402 are connected to (and controlled by) the central controller. For example, the central controller may determine that the same game is played on all assemblies 402 connected to the central controller. Additionally, for example, in configuration 700, if all assemblies 402 were connected to the same central controller, the central controller determines that there are four assemblies 402 controlled by the central controller. Next, based on the determined game or game(s) played on the assemblies 402 and the determined number of assemblies 402, the central controller determines content that may be displayed on the configuration of assemblies 402. For example, some content to display may require two or more assemblies 402, three or more assemblies 402, four or more assemblies 402, etc. and some content may be specific to different games.

In some embodiments, the central controller determines the number of assemblies 402 in a bank or configuration (e.g., the number of assemblies connected to the central controller) via signals received from the corresponding EGAs 404. For example, the central controller may receive signals from the EGAs 404 where each respective signal has a unique identifier associated with the respective EGA 404 from which the signal was sent. The central controller then identifies the number of unique identifiers received, which corresponds to the number of assemblies 402 in the bank or configuration.

In some embodiments, the central controller determines which EGAs 404 in a configuration are part of an assembly 402 (e.g., which EGAs 404 include a corresponding housing 406) via signals received from the EGAs 404. For example, the central controller may receive signals from the EGAs 404 where each respective signal has a unique identifier associated with the respective EGA 404 from which the signal was sent. The identifier may further indicate whether corresponding EGA 404 is part of an assembly 402. The central controller then identifies the number of unique identifiers received, which corresponds to the number of EGAs 404 in the bank or configuration. Further, the central controller then determines which EGAs 404 have a corresponding housing 406 via the identifier received.

In some embodiments, the central controller may also determine the arrangement of the assemblies 402 and/or EGAs 404, e.g., by determining positioning of the assemblies 402 relative to one another via position sensors or signals received from EGAs 404 or assemblies 402 in a bank, as described above. For example, the central controller may determine that assemblies 402 are in configuration 700 or configuration 800. Based on the number of assemblies 402 in the configuration and the detected arrangement of assemblies 402 in the configuration, the central controller determines content that may be displayed on the assemblies 402 of the configuration. For example, if the central controller determines that there are two assemblies 402 next to one another (e.g., similar to assemblies 402 on the right side of the rectangular configuration 800) such that the display 432 of each assembly forms a substantially continuous display that can be simultaneously viewed, the central controller may determine that some content to display (e.g., text) may be continuously displayed across assemblies 402. Further, if the central controller determines that an assembly 402 is part of a configuration, but display 432 of that assembly 402 is not easily viewable at the same time as other displays 432 of other assemblies 402 of the configuration (e.g., an isolated assembly 402, similar to the front assembly 402 as shown in configuration 800), then the central controller may determine that some content to display should not be continuously displayed across all assemblies 402 in the configuration.

In another example, the central controller may determine that five out of six EGAs 404 include a corresponding housing 406 and that the configuration therefore includes five assembles 402 and one stand-alone EGA 404 that is not part of an assembly 402. The central controller may control content displayed on stand-alone EGA 404 such that content is correctly displayed on stand-alone EGA 404. For example, content that would normally be displayed on all of front wall 408 of housing 406 and on corresponding EGA 404, then the content may be adjusted to be fully displayed on stand-alone EGA 404.

In some embodiments, content to display on assembly 402 may be based on content displayed on corresponding EGA 404. For example, during gameplay, a player may have the option to mirror or extend the display on EGA 404 to corresponding housing 406. Accordingly, the gameplay on EGA 404 may be at least partially viewable on housing 406 of assembly 402, which may attract other players to play to unused EGAs 404 of the configuration, or unused EGAs 404 in the venue and may provide easier viewing of the gameplay for the player.

In some embodiments, content to display on an assembly 402 or a bank of assemblies 402 may be based upon certain events/triggers at at least one of EGAs 404. For example, the central controller may, based upon an event (e.g., a gameplay related event) at EGA 404, determine a stored message/video sequence/animation to be displayed (e.g., also based upon a number of assemblies 402 in a bank) that is associated with the event. The central controller may then communicate with one or more media players in order to control display of the determined message/video sequence/animation on at least one assembly 402 in the bank of assemblies 402. For example, when a jackpot is presented at one EGA 404 in a bank or configuration of assemblies 402, a signal may be sent to the central controller indicating that the jackpot was received. Based on the signal, the central controller may determine that content corresponding to the jackpot should be continuously displayed on all assemblies 402 in the configuration or bank. The displayed content may be continuously or discontinuously displayed on assemblies 402 in the configuration based on, e.g., the number of assemblies 402 and/or the arrangement of assemblies 402 in the configuration or bank.

In some embodiments, the central controller determines which game (or games) are played on assembles 402 connected to a central controller and how many assemblies are connected to (and controlled by) the central controller before determining content to display on the assembly. For example, the central controller may determine that the same game is played on all assemblies 402 connected to a central controller. Additionally, the central controller may determine that there are four assemblies 402 controlled by the central controller. Next, based on the determined number of assemblies 402 and the game played on the assemblies 402, the central controller determines content that may be displayed on the configuration of assemblies 402. For example, some content to display may be specific to a certain game and/or require two or more assemblies 402, three or more assemblies 402, four or more assemblies 402, etc. for display.

In some embodiments, the central controller may track a schedule of external events, and based upon an external event (e.g., not gameplay related) the central controller may determine a stored and/or external message/video sequence/animation to be displayed that is associated with the event. For example, the central controller may be able to determine an EGA 404 that is currently not being played. In response to this determination, the controller may control the corresponding assembly 402 to display an animation to attract a player to the play the EGA 404. In another example, the central controller may determine that a sporting event (e.g., a football game) is currently occurring, soon to occur, or recently previously occurred. In response, the central controller may control an assembly 402 or a bank of assemblies 402 to display an advertisement for the sporting event. Additionally, the controller may control some assemblies 402 of a configuration to display the logo of one of the teams involved in the sporting event, and may also control other assemblies 402 of the configuration to display a logo of another team involved in the sporting event. During the sporting event, the central controller may also track progress of the sporting event (e.g., based on received signals) and may control assemblies 402 to display aspects of the sporting event (e.g., the score, highlights, etc.) as the aspects are updated in real time.

In yet another example, the central controller may determine (e.g., based on the date) that the current season is Winter. In response, the central controller may control the assembly 402 or bank of assemblies 402 to display content related to Winter (e.g., snow, Christmas trees, etc.).

In yet another example, the central controller may control assembly 402 to display different advertisements based on the time of day. For example, from 8:00-10:00 AM, central controller may control assembly 402 to display advertisements for breakfast restaurants within or external to the venue and graphics of food generally associated with breakfast (e.g., pancakes, biscuits etc.). The central controller may implement a similar process for other mealtimes (e.g., lunch or dinner).

Other examples of external content that may be displayed on an assembly 402 or on a bank of assemblies 402 may include, for example, advertising for shows occurring at the venue, special promotions at the venue (e.g., restaurant or show promotions), third party advertisements and promotions, etc. In some embodiments, advertising and promotions displayed on an assembly 402 or bank of assemblies 402 may be based on a player profile of a player that is playing an EGA 404 within the bank, as described further herein.

In some embodiments, a player may interact with content displayed on assemblies 402 via, e.g., the touch screen interface on display 432. For example, assembly 402 may display an advertisement for food or beverage services at the venue. While displaying the advertisement, assembly 402 may also display a button with text that reads "Press here to order". If the player presses the button, as an example, a beverage is ordered and then delivered to the assembly 402 from which the player ordered the drink. Payment for the drink may be made at the time of ordering (e.g., via credit/debit card, via loyalty card, etc.) at assembly 402 or upon delivery of the beverage to the player. The touchscreen interface on assemblies 402 provides convenient access to additional functionalities that may not typically be provided by EGAs 404.

In some embodiments, a player may interact with content displayed on assemblies 402 via gameplay on EGAs 404. For example, assembly 402 may display an advertisement for airline tickets, along with an indication that the player can "Earn bonus to receive 2× rewards points on your next flight". That is, if the player earns the bonus during gameplay, then the player will also earn 2× the rewards points on their next flight taken on the advertising airline. If the player earns the bonus, the assembly 402 may, for example, display a message requesting the player interact with the touch screen of assembly 402 to claim their airline reward. For example, assembly 402 may display "Tap here to claim your reward". Upon touching the indicated location on the touchscreen, assembly 402 presents the airline reward to the player (e.g., via a voucher printed by ticket printer 222, a barcode to scan with their mobile device, an upload onto their loyalty card, etc.).

In some embodiments, a player's player profile may affect display on housing 406 of EGA 404 that the player is using. For example, when setting up an account with a venue, a player may provide information for a player profile (e.g., information viewable using player tracking interface 232) that is stored in the player profile. The information may include, for example, the player's first name, favorite color, favorite sports team, favorite food, birthday, etc. The player's profile may be linked to or stored on their loyalty card (e.g., at least one identifier for the player's profile may be stored on the loyalty card), and may also be linked to a mobile device of the player. When the player initiates play on EGA 404 (e.g., via their loyalty card or via their mobile device), housing 406 accesses information of the profile corresponding to the player (e.g., by using the identifier(s) stored on the loyalty card to perform a lookup on a server to retrieve information on the player profile associated with the loyalty card). Housing 406 or the player's mobile device may prompt the player for permission to access and/or display content on assemblies 402 based on the information within the player's profile. In some embodiments, the player provides permission at an earlier time for assemblies 402 to display information from the player's profile. For example, if it is the player's birthday and the player's first name is "John", then the assembly 402 or the player's mobile device may ask the player if they would like assembly 402 to display a message for their birthday. Upon receiving permission, assembly 402 displays "Happy Birthday, John!". Depending on the number of assemblies 402 in the configuration and/or the arrangement of assemblies 402 in the configuration, the player may have the option to display the message on only their assembly 402, or across multiple assemblies 402.

In some embodiments, a player's player profile may include historical player information about games the player has previously played (e.g., information tracked by player tracking system server 110). For example, when a player plays "Game A", information is stored on the player's profile indicating the date on which the game was played and the duration for which the player played the game. When the player returns to play the same game, assembly 402 may display content based on the historical information stored in the player's profile. For example, if a player initiates play of a game, and the historical player information in the player's player profile indicates that the player played the same game the night before, then the assembly 402 on which the player is using may display a message welcoming the player back to the game. In another example, if the historical player information in the player's player profile indicates that the player has not played the game for a while (e.g., 1 month or more), then the assembly 402 corresponding to EGA 404 on which the player is playing may display a message asking the player where they have been.

Additionally, a player's player profile may affect which advertisements or promotions are displayed to the player when the player uses an EGA 404 of an assembly 402. For example, if the player's favorite food is pizza, then the central controller may determine that assembly 402 that the player is using should display an advertisement or promotion for pizza or pizza products about noon (e.g., lunch time). In another example, if the player's profile includes information about their favorite kind of music, assembly 402 may display advertisements or promotions for a show (show times, performers, etc.) internal or external to the venue based on the player's favorite kind of music. In some embodiments, the central controller controlling assembly 402 may also track the date of the show corresponding to the advertisement or promotion, and may cause assembly 402 to display a countdown to the show. For example, if the central controller determines that the show starts in an hour, assembly 402 may display a notification to the player indicating that the show starts in an hour. Additionally, in a case where the show is internal to the venue, assembly 402 may display directional arrows directing the player to the show, in case the player would like to attend the show. In some embodiments, assembly 402 displays content asking the player if they would like to attend the show, and also displays content asking the player to interact with the touch screen interface to indicate if they would like to attend the show. Upon the player indicating that the player would like to attend the show, assembly 402 displays content with directional arrows directing the player to the show, and may also display content enabling the player to purchase one or more tickets for the show via the touch screen interface of assembly 402.

In some embodiments, when a player is playing an EGA 404 of an assembly 402 within a configuration, the player may reserve another EGA 404 of the configuration via the EGA 404 on which they are playing. For example, if a player is playing an EGA 404 and is waiting for a friend, the player may reserve an unused EGA 404 (e.g., assembly 402) within the same configuration for their friend. Additionally, once reserved, the reserved assembly 402 (e.g., reserved EGA 404 and corresponding housing 406) may display a message on the reserved assembly 402 that the assembly 402 is reserved. Further, the player reserving the assembly 402 may input information (e.g., a first name) about the player for which reserved assembly 402 is reserved for, and reserved assembly 402 may display a message including the inputted information. For example, if a player reserves an assembly 402, and indicates that the first name of the player for which the assembly 402 is reserved for is "John", then the reserved assembly 402 may display a message indicating "Reserved for John". Assemblies 402 may further provide a time limit for reserving assemblies 402. For example, the time limit may be 10 minutes, and the reserved assembly 402 may display the remaining time for which the assembly 402 is reserved. If the player for which reserved assembly 402 is reserved does not start playing on the EGA 404 of reserved assembly 402 before the time limit is reached, then the assembly 402 is no longer reserved and no longer displays the message indicating that assembly 402 is reserved. In some embodiments, EGAs 404 may be reserved for other purposes (e.g., tournament play), and the assemblies 402 may display information regarding why their associated EGAs 404 are reserved.

In some embodiments, assemblies 402 of a configuration or bank may be used in a tournament mode. In a tournament mode, a game is played on EGAs 404 in which multiple players play against one another via assemblies 402 within the same bank or configuration. When assemblies 402 are used in tournament mode, the central controller may track the performance of each player, and may control each assembly 402 to display the corresponding player's progress or place in the game. For example, if a player is ⅔ of the way toward a goal, and the player is in first place, then corresponding assembly 402 may display a progress bar that is ⅔ full and a message indication that the player is in first place, which may help the player and/or other players determine progress in the tournament game via the extended display (e.g., a leaderboard associated with the tournament may be displayed on the assembly). In some embodiments, if assembly 402 includes a camera, assembly may also display a picture of the player along with the message.

In the example embodiment, the central controller is configured to manage display on assemblies 402 by making certain determinations of priority of content to display (e.g., by creation of a queue). For example, the central controller may determine that a jackpot is presented at an EGA 404 in a bank of EGAs 404 at about the same time an advertisement is scheduled to be presented on assemblies 402 within the bank of assemblies 402. Accordingly, the central controller would determine that content corresponding to the jackpot should be displayed on the assemblies 402 before the scheduled advertisement is displayed (e.g., based on rules stored in the memory). In another example, the central controller may determine that jackpots were presented on different EGAs 404 in a bank of assemblies 402 at about the same time. Accordingly, the central controller would determine video/animation sequences for each of the jackpots, and would determine an order in which to display the sequences (e.g., based upon rules stored in a memory—for example, a sequence associated with the most valuable jackpot first, a sequence associated with the first-occurring jackpot first, etc.). Thus, control of display on assemblies 402 in a bank of assemblies is centrally controlled for seamless integration of more and/or less assemblies in the bank, as described herein.

In some embodiments, the central controller may be configured to look up videos/animations in memory based upon a trigger event and a number of assemblies 402 in a bank of assemblies 402 connected to the central controller (e.g., different sequences may be displayed for the same trigger event depending upon the number of assemblies 402 in the bank). For example, one trigger event may be associated with at least one animation traveling around the bank of assemblies. Accordingly, the central controller would determine the number of assemblies 402 in the bank in order to control display of the animation traveling across each of assemblies 402.

In some embodiments, the central controller may control display on one or more assemblies 402 in a bank of assemblies 402 in order to present a game outcome of a game played on a corresponding EGA 404 (e.g., as opposed to an outcome being determined, then presented on an EGA 404 of an assembly 402, and then a "celebration" presented on/as traveling across all of assemblies 402 in a bank). For example, a backend system (e.g., game processing backend system 314) may determine that a bonus should be presented at an EGA 404 in a bank of assemblies 402, and the backend system may communicate to the central controller the EGA 404 to which the bonus should be presented. The central controller may control the assembly 402 corresponding to randomly determined EGA 404 at which the bonus should be presented to display an animation corresponding to the bonus such that assembly 402 (e.g., housing 406 and EGA 404) presents an outcome of the game played on corresponding EGA 404. In some embodiments, the central controller may control assembly 402 corresponding to EGA 404 at which the bonus should be presented to display an indication of the bonus on housing 406 of assembly 402 prior to displaying an indication of the bonus on EGA 404 of assembly 402. In some embodiments, the central controller may control assembly 402 corresponding to EGA 404 at which the bonus should be presented to only display an indication of the bonus on corresponding housing 406 and not on corresponding EGA 404.

In other embodiments, a configuration or bank of assemblies 402 may present an outcome of a game played on corresponding EGAs 404. For example, a backend system (e.g., game processing backend system 314) may determine that a bonus should be presented at a randomly determined EGA 404 in a bank of assemblies 402, and the backend system may communicate the randomly determined EGA 404 to which the bonus should be presented to the central controller. In order to communicate to the players which EGA 404 the bonus will be presented at, the central controller may cause display of an animation traveling around/across the bank of assemblies, and ending at one housing 406 or assembly 402—thereby communicating that the EGA 404 associated with the assembly 402 where the animation ended will receive the bonus.

In some embodiments, different animations corresponding to different numbers of assemblies 402 in a bank may be stored in memory. For example, for a game event (e.g., a jackpot), different animations corresponding to different numbers of assemblies 402 may be stored in memory (e.g., wherein the animations have the same theme). For example, in some embodiments a buffalo stampede animation may be determined to be provided. Upon determining to provide the buffalo stampede animation, a lookup in memory may be performed in order to retrieve the buffalo stampede animation that corresponds to the number of assemblies currently in the bank. For example, the animation for a four EGA 404 configuration (e.g., FIG. 7) would be different than the animation for a two EGA 404 configuration (e.g., FIG. 6), in order for the animation to be controlled to be displayed across each of the number of assemblies 402. Similar lookups may be performed for other events where different animations are displayed (e.g., advertisements, scheduled events, etc.).

In some embodiments, animations may only be displayed at a portion or subset of assemblies 402 in a bank of assemblies. For example, for a smaller jackpot presentation, display of a celebratory animation may only be displayed on assemblies adjacent to the assembly 402 where the jackpot is presented (e.g., only the assemblies directly next to the assembly 402 where the jackpot is presented, and not other assemblies in a bank of assemblies). In another example, for a grand (larger) jackpot presentation, display of a celebratory animation may occur on all assemblies 402 in a bank of assemblies 402.

Figure 10:
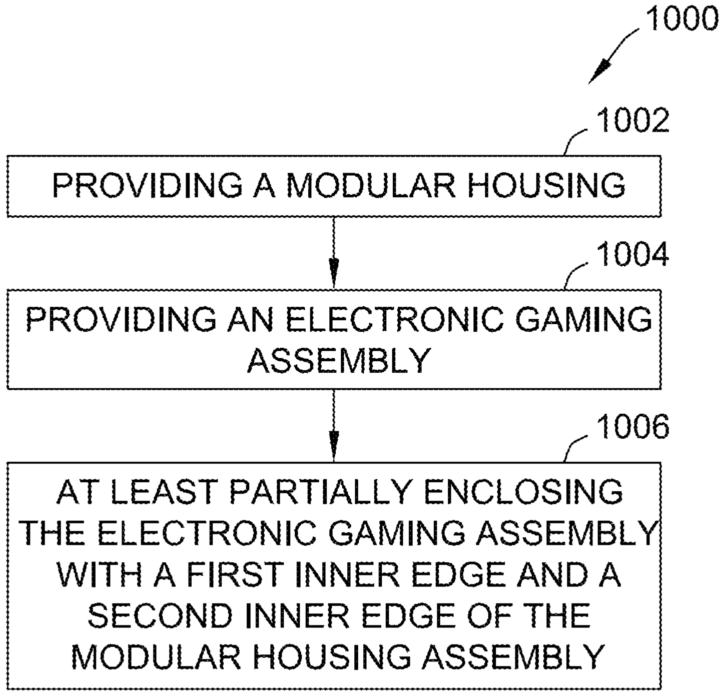
FIG. 10 illustrates an example method of assembling an electronic gaming assembly.

FIG. 10 illustrates an example method 1000 of assembling an electronic gaming assembly. In some embodiments, method 1000 includes providing 1002 a modular housing. The modular housing may be modular housing 406 described herein. The method 1000 further includes providing 1004 an electronic gaming assembly. The electronic gaming assembly may be EGA 404 described herein. The method further includes at least partially enclosing 1006 the electronic gaming assembly with a first inner edge and a second inner edge of the modular housing assembly. The first inner edge and the second inner edge may be first inner edge 426-1 and second inner edge 426-2 of modular housing 406 described herein. In some embodiments, the method 1000 further includes coupling the modular housing to the at least one other modular housing.

Figure 11:
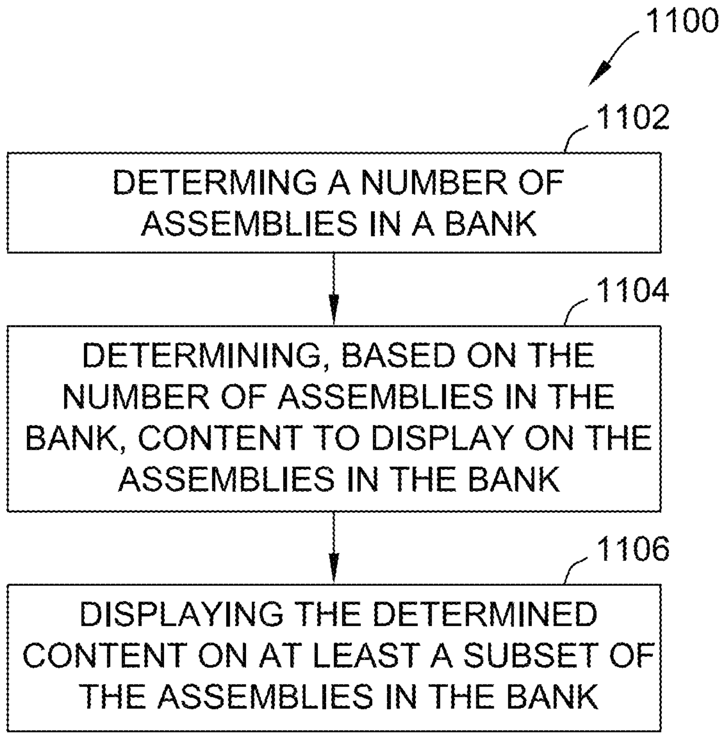
FIG. 11 illustrates an example method of displaying content on a bank of assemblies that each include a modular housing and an electronic gaming assembly.

FIG. 11 illustrates an example method 1100 of displaying content on a bank of assemblies that each include a modular housing and an electronic gaming assembly. In some embodiments, method 1100 includes determining 1102 a number of assemblies in the bank. The assemblies may be assemblies 402 described herein, the modular housing may be modular housing 406 described herein, electronic gaming assembly may be EGA 404 described herein, and the bank may be configurations 400, 500, 600, 700, 800, 900 described herein. The method 1000 further includes determining 1104, based on the number of assemblies in the bank, content to display on the assemblies in the bank. The method further includes displaying 1106 the determined content on at least a subset of the assemblies in the bank.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A modular housing for an electronic gaming assembly in communication with at least one processor, the modular housing comprising:
- a front wall including an upper portion, a first side portion, and a second side portion, wherein the first and second side portions extend from the upper portion and at least partially define an opening, the first and second side portions each having an inner edge and an outer edge;
- a first side wall extending from the outer edge of the first side portion;
- a second side wall extending from the outer edge of the second side portion, wherein the opening is sized to receive the electronic gaming assembly including a cabinet of the electronic gaming assembly, and wherein at least one of the first side wall or the second side wall forms an acute angle with the front wall; and
- an electronic connector configured to electronically connect the modular housing with the electronic gaming assembly to provide at least one of power transfer or electronic communications between the modular housing and the electronic gaming assembly,
- wherein the at least one processor in communication with the modular housing is configured to:
  - receive data indicating that the modular housing is a standalone modular housing; and
  - control display of content on the front wall, the first side wall, and the second side wall based upon the modular housing being a standalone modular housing.

2. The modular housing of claim 1, wherein the modular housing is coupled to the electronic gaming assembly, and wherein the content is associated with an electronic game provided by the electronic gaming assembly.

3. The modular housing of claim 1, wherein at least one of the first side wall or the second side wall of the modular housing is configured to be positioned adjacent to a side wall of another modular housing to form a side-by-side configuration of two modular housings.

4. The modular housing of claim 1, wherein the first side wall and the second side wall of the modular housing are configured to be positioned adjacent to side walls of other modular housings to form a side-by-side configuration of two or more modular housings.

5. The modular housing of claim 1, wherein at least one of the first side wall or the second side wall of the modular housing is configured to be positioned adjacent to a side wall of another modular housing to form a perpendicular configuration of two modular housings.

6. The modular housing of claim 1, wherein the first side wall and the second side wall of the modular housing are configured to be positioned adjacent to side walls of other modular housings to form a square configuration of four modular housings.

7. The modular housing of claim 1, wherein the first side wall and the second side wall of the modular housing are configured to be positioned adjacent to side walls of other modular housings to form a rectangular configuration of more than four modular housings.

8. The modular housing of claim 1, wherein the first side wall and the second side wall of the modular housing are configured to be positioned adjacent to side walls of other modular housings to form a hexagonal configuration of six modular housings.

9. The modular housing of claim 1, wherein the first side wall and the second side wall of the modular housing are configured to be positioned adjacent to side walls of other modular housings to form a configuration of more than six modular housings.

10. The modular housing of claim 1, wherein the at least one of the first side wall or the second side wall of the modular housing is configured to be positioned adjacent to a component including a side wall, such that the side wall of the component forms a right angle with the front wall of the modular housing.

11. A system comprising:
- a first modular housing for housing a first electronic gaming assembly, the first modular housing comprising:
  - a front wall including an upper portion, a first side portion, and a second side portion, wherein the first and second side portions each extend from the upper portion and at least partially define an opening sized to receive the first electronic gaming assembly including a cabinet of the first electronic gaming assembly, the first and second side portions each having an inner edge and an outer edge;
  - a first side wall extending from the outer edge of the first side portion;
  - a second side wall extending from the outer edge of the second side portion; and
  - an electronic connector of the first modular housing configured to electronically connect the first modular housing with the first electronic gaming assembly to provide at least one of power transfer or electronic communications between the first modular housing and the first electronic gaming assembly; and
- a second modular housing for housing a second electronic gaming assembly, the second modular housing comprising:
  - a front wall including an upper portion, a first side portion, and a second side portion, wherein the first and second side portions each extend from the upper portion and at least partially define an opening sized to receive the second electronic gaming assembly including a cabinet of the second electronic gaming assembly, the first and second side portions each having an inner edge and an outer edge;
  - a first side wall extending from the outer edge of the first side portion;
  - a second side wall extending from the outer edge of the second side portion, wherein the second modular housing is positioned at a right angle to the first modular housing to form a perpendicular configuration of two modular housings; and
  - an electronic connector of the second modular housing configured to electronically connect the second modular housing with the second electronic gaming assembly to provide at least one of power transfer or electronic communications between the second modular housing and the second electronic gaming assembly; and
- at least one processor in communication with the first modular housing and the second modular housing, wherein the at least one processor is configured to:
  - receive data indicating a number of modular housings connected in a gaming system comprising the first modular housing and the second modular housing; and
  - cause display of content on the front wall of the first modular housing and the front wall of the second modular housing based upon the number of modular housings connected in the gaming system.

12. The system of claim 11 further comprising a third modular housing and a fourth modular housing coupled to the system, wherein the third modular housing is coupled to the first modular housing and the fourth modular housing is coupled to the second modular housing, and wherein the first, second, third, and fourth modular housings are arranged in a square configuration.

13. The system of claim 11, wherein the system defines a flat rear surface that facilitates positioning the system against a wall of a venue.

14. The system claim 11, wherein the first electronic gaming assembly is coupled to the first modular housing, wherein the second electronic gaming assembly is coupled to the second modular housing, wherein the first electronic gaming assembly is coupled to the first modular housing via at least one of a nut and bolt coupling, a screwed coupling, a vice-grip coupling, a harness coupling, or an elastic coupling, and wherein the second electronic gaming assembly is coupled to the second modular housing via at least one of a nut and bolt coupling, a screwed coupling, a vice-grip coupling, a harness coupling, or an elastic coupling.

15. A system comprising:
- a first modular housing for housing a first electronic gaming assembly, the first modular housing comprising:
  - a front wall including an upper portion, a first side portion, and a second side portion, wherein the first and second side portions each extend from the upper portion and at least partially define an opening sized to receive the first electronic gaming assembly including a cabinet of the first electronic gaming assembly, the first and second side portions each having an inner edge and an outer edge;

a first side wall extending from the outer edge of the first side portion;

a second side wall extending from the outer edge of the second side portion, wherein at least one of the first side wall or the second side wall forms an acute angle with the front wall; and an electronic connector of the first modular housing configured to electronically connect the first modular housing with the first electronic gaming assembly to provide at least one of power transfer or electronic communications between the first modular housing and the first electronic gaming assembly;

a second modular housing for housing a second electronic gaming assembly, the second modular housing comprising:

a front wall including an upper portion, a first side portion, and a second side portion, wherein the first and second side portions each extend from the upper portion and at least partially define an opening sized to receive the second electronic gaming assembly including a cabinet of the second electronic gaming assembly, the first and second side portions each having an inner edge and an outer edge;

a first side wall extending from the outer edge of the first side portion;

a second side wall extending from the outer edge of the second side portion, wherein at least one of the first side wall or the second side wall forms an acute angle with the front wall, and wherein the second modular housing is positioned adjacent to the first modular housing to form a side-by side configuration of two modular housings; and an electronic connector of the second modular housing configured to electronically connect the second modular housing with the second electronic gaming assembly to provide at least one of power transfer or electronic communications between the second modular housing and the second electronic gaming assembly; and at least one processor in communication with the first modular housing and the second modular housing, wherein the at least one processor is configured to:

receive data indicating a number of modular housings connected in a gaming system comprising the first modular housing and the second modular housing; and cause display of content on the front wall of the first modular housing and the front wall of the second modular housing based upon the number of modular housings connected in the gaming system.

16. The system of claim 15, wherein the system defines a flat rear surface that facilitates positioning the system against a wall of a venue.

17. The modular housing of claim 1, wherein the modular housing and the electronic gaming assembly are further mechanically coupled together by at least one of a vice-grip coupling, a nut and bolt coupling, a screwed coupling, an elastic coupling, or a harness coupling.

18. The system of claim 11, wherein the first modular housing and the second modular housing are coupled at the right angle by at least one of a vice-grip coupling, a nut and bolt coupling, a screwed coupling, an elastic coupling, or a harness coupling.

19. The modular housing of claim 1, wherein the at least one processor is included in at least one of the modular housing, the electronic gaming assembly, or a server in communication with the modular housing.

20. The system of claim 11, wherein the at least one processor is further configured to perform a lookup in memory based upon the number of modular housings connected in the gaming system to identify the content, wherein different versions of the content are stored in the memory for different numbers of modular housings.

* * * * *